US012551797B2

(12) United States Patent
Li et al.

(10) Patent No.: US 12,551,797 B2
(45) Date of Patent: Feb. 17, 2026

(54) VIRTUAL OBJECT CONTROL METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Peiyan Li, Shenzhen (CN); Yuan Fu, Shenzhen (CN); Jiancai Cheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 788 days.

(21) Appl. No.: 17/494,788

(22) Filed: Oct. 5, 2021

(65) Prior Publication Data

US 2022/0023761 A1 Jan. 27, 2022

Related U.S. Application Data

(63) Continuation of application No. PCT/CN2021/083306, filed on Mar. 26, 2021.

(30) Foreign Application Priority Data

Apr. 28, 2020 (CN) ......................... 202010350845.9

(51) Int. Cl.

*A63F 13/56* (2014.01)
*A63F 13/218* (2014.01)

(Continued)

(52) U.S. Cl.

CPC ............ *A63F 13/56* (2014.09); *A63F 13/218* (2014.09); *A63F 13/5252* (2014.09); *A63F 13/5255* (2014.09)

(58) Field of Classification Search

CPC .............. A63F 13/5252; A63F 13/5255; A63F 13/56

See application file for complete search history.

(56) References Cited

U.S. PATENT DOCUMENTS 5,947,819 A * 9/1999 Ohshima ................. A63F 13/57 463/2
7,326,117 B1 * 2/2008 Best ...................... A63F 13/843 463/32

(Continued)

FOREIGN PATENT DOCUMENTS

CN 106598438 A 4/2017
CN 107145346 A 9/2017

(Continued)

OTHER PUBLICATIONS

Wikipedia Article on Astral Chain (Year: 2019), downloaded May 24, 2024.*

(Continued)

*Primary Examiner* — Xuan M Thai

(74) *Attorney, Agent, or Firm* — Anova Law Group, PLLC

(57) ABSTRACT

A virtual object control method includes: displaying a first scene picture. The first scene picture includes a summoned object controlling control and a character controlling control in a virtual scene interface used for presenting a virtual scene. In response to a first touch operation on the summoned object controlling control, it is displayed that the virtual summoned object moves in the virtual scene based on operation information of the first touch operation. Further, in response to a second touch operation on the character controlling control, it is displayed that a virtual character performs a behavior action corresponding to the character controlling control.

20 Claims, 15 Drawing Sheets

(51) Int. Cl.
*A63F 13/5252* (2014.01)
*A63F 13/5255* (2014.01)

(56) References Cited

U.S. PATENT DOCUMENTS

| | | | |
|---|---|---|---|
| 7,455,589 | B2 | 11/2008 | Neveu et al. |
| 8,935,438 | B1 | 1/2015 | Ivanchenko |
| 10,990,274 | B2 | 4/2021 | Nakahara |
| 2012/0015694 | A1* | 1/2012 | Han .................... G06F 16/9577 455/566 |
| 2017/0011554 | A1* | 1/2017 | Burba ..................... G06T 15/20 |
| 2017/0256126 | A1 | 9/2017 | Kimura et al. |
| 2018/0024660 | A1 | 1/2018 | Wang |
| 2019/0070495 | A1* | 3/2019 | He ........................ A63F 13/847 |
| 2019/0215372 | A1 | 7/2019 | Quan |
| 2019/0265882 | A1 | 8/2019 | Nakahara |
| 2019/0299101 | A1 | 10/2019 | Wakeford et al. |
| 2020/0086216 | A1* | 3/2020 | Shimomoto ............ A63F 13/58 |
| 2020/0282308 | A1* | 9/2020 | Guo ...................... A63F 13/537 |

FOREIGN PATENT DOCUMENTS

| | | | |
|---|---|---|---|
| CN | 110478904 | A | 11/2019 |
| CN | 110507994 | A | 11/2019 |
| CN | 110694261 | A | 1/2020 |
| CN | 111013140 | A | 4/2020 |
| CN | 111035918 | A | 4/2020 |
| CN | 111589131 | A | 8/2020 |
| CN | 111589133 | A | 8/2020 |
| JP | 2002163677 | A | 6/2002 |
| JP | 2004529678 | A | 9/2004 |
| JP | 2017153909 | A | 9/2017 |
| JP | 201875225 | A | 5/2018 |
| JP | 2018517449 | A | 7/2018 |
| KR | 20190057381 | A | 5/2019 |

OTHER PUBLICATIONS

The Japan Patent Office (JPO) Notification of Reasons for Refusal for Application No. 2021-564349 Apr. 25, 2022 6 Pages (including translation).

Anonymous, “Astral Chain,” Game Watch [online], Aug. 27, 2019, Retrieved from the Internet: URL: https://game.watch.impress.co.jp/docs/review/1202021.html, [retrieved on May 12, 2022]. 46 pages.

Anonymous, “Astral Chain,” Weekly Famitsu, Sep. 12, 2019, Gz Brain Co., Ltd., Aug. 29, 2019, vol. 34, No. 37, Serial No. 1604, p. 48-65. 22 pages.

Intellectual Property Office of Singapore Search report for Application No. 11202111568Q Aug. 31, 2023 9 pages.

The State Intellectual Property Office of the People’s Republic of China (SIPO) Office Action 1 for for 202010350845.Mar. 9, 30, 2021 12 Pages (including translation).

The World Intellectual Property Organization (WIPO) International Search Report for PCT/CN2021/083306 Jun. 24, 2021 8 Pages (including translation).

Game Ouch, “[King of Glory] Do you miss the cute bear of Ahn’Qiraj? See how a bunch of big bears dismantle the tower,” Tencent Video, Dec. 6, 2016 (Dec. 6, 2016), Retrieved from the Internet: URL: https://v.qq.com/x/page/x0353qzs8qu.html. 2 pages.

Commentary Bottle, “[Bottle Commentary] King of Glory Yuan Song Video Tutorial,” Bilibili.com, Jul. 5, 2018 (Jul. 5, 2018), Retrieved from the Internet:URL: https://www.bilibili.com/video/av26194833. 1 page.

Korean Intellectual Property Office (KIPO) Office Action 1 for 20217035082 Sep. 21, 2023 29 Pages (including translation).

Korean Intellectual Property Office (KIPO) Office Action 2 for 20217035082 Apr. 18, 2024 30 Pages (including translation).

Skill eight assassins side cost attack I Prince young, this is you? Internet video city water, Aug. 28, 2019 (Aug. 28, 2019), “https://www youtube. com. / watch?v =-CGSB9TNJG0”.

King Glory: National service list one yuan song deep teaching (detailed explanation of skills/three sets of continuous moves/five points of actual combat), Mar. 16, 2020 (Mar. 16, 2020), “https://zhuanlan.zhihu.com/p/103738672”.

King of Glory Yuange Strategy Guide: Undercover Hero Yuange Puppet in the Battlefield Wins Glory, Jan. 21, 2019 (2019-01-21), “https://www.sohu.com/a/290450794_100237825”.

Astral Chain, A new sense of exhilarating dual action woven with the bio-weapon legion! What is the appeal of the new action game produced by the super luxury production team?, Aug. 30, 2019 (Aug. 30, 2019), “https://game.watch.impress.co.jp/docs/review/1202021.html”.

* cited by examiner

VIRTUAL OBJECT CONTROL METHOD AND APPARATUS, DEVICE, AND STORAGE MEDIUM

RELATED APPLICATION(S)

This application is a continuation application of PCT Patent Application No. PCT/CN2021/083306, filed on Mar. 26, 2021, which claims priority to Chinese Patent Application No. 202010350845.9, filed on Apr. 28, 2020 and entitled "VIRTUAL OBJECT CONTROL METHOD AND APPARATUS, DEVICE, AND STORAGE MEDIUM", all of which are incorporated herein by reference in entirety.

FIELD OF THE TECHNOLOGY

The present disclosure relates to the field of virtual scene technologies, and in particular, to a virtual object control method and apparatus, a device, and a storage medium.

BACKGROUND

In an application supporting a virtual scene, a user may control a virtual object in the virtual scene by setting a virtual control in the virtual scene.

A plurality of virtual controls may be present in the virtual scene, and during using, the plurality of virtual controls coordinate with each other to control a controllable object.

When there are a plurality of controllable objects in the virtual scene, the user may control one selected controllable object by using the virtual control.

However, when the user desires to control another controllable object, the user often needs to switch to select the another controllable object through a switching operation before switching to control the controllable object, resulting in relatively low control efficiency.

SUMMARY

Embodiments of the present disclosure provide a virtual object control method and apparatus, a device, and a storage medium, which helps improve control efficiency for a controlled object and save processing resources and power resources of a terminal.

In one aspect, the present disclosure provides a virtual object control method, performed by a terminal, the method including: displaying a first scene picture in a virtual scene interface used for presenting a virtual scene, the first scene picture being a picture of the virtual scene observed from a viewing angle corresponding to a virtual summoned object in the virtual scene, the virtual scene interface including a summoned object controlling control and a character controlling control; displaying, in response to a first touch operation on the summoned object controlling control, that the virtual summoned object moves in the virtual scene based on operation information of the first touch operation; and displaying, in a movement process of the virtual summoned object in the virtual scene based on the operation information and in response to a second touch operation on the character controlling control, that a virtual character performs a behavior action corresponding to the character controlling control.

In another aspect, the present disclosure provides a virtual object control method, performed by a terminal, the method including: presenting a first picture in a virtual scene interface used for presenting a virtual scene, the first picture being a picture of the virtual scene observed from a viewing angle corresponding to a virtual character in the virtual scene, the virtual scene interface including a summoned object controlling control and a character controlling control; presenting a second picture in the virtual scene interface in response to receiving a click operation on the summoned object controlling control, the second picture being a picture that the virtual character summons a virtual summoned object in the virtual scene; presenting a third picture and a fourth picture in response to receiving a press operation on the summoned object controlling control, the third picture being a picture of the virtual scene observed from a viewing angle corresponding to the virtual summoned object, the fourth picture being a thumbnail picture of the first picture, the fourth picture being superimposed and displayed on an upper layer of the first picture, and a size of the fourth picture being less than that of the third picture; presenting a fifth picture in response to receiving a slide operation on the summoned object controlling control, the fifth picture being a picture of controlling the virtual summoned object to move in the virtual scene based on operation information of the slide operation; and updating and displaying the fourth picture into a sixth picture in response to receiving a trigger operation on the character controlling control in a process of presenting the fifth picture, the sixth picture being a picture that the virtual character performs a behavior action corresponding to the character controlling control.

In yet another aspect, the present disclosure provides a virtual object control apparatus, the apparatus including a memory storing computer program instructions; and a processor coupled to the memory and configured to execute the computer program instructions and perform: displaying a first scene picture in a virtual scene interface used for presenting a virtual scene, the first scene picture being a picture of the virtual scene observed from a viewing angle corresponding to a virtual summoned object in the virtual scene, the virtual scene interface including a summoned object controlling control and a character controlling control; displaying, in response to a first touch operation on the summoned object controlling control, that the virtual summoned object moves in the virtual scene based on operation information of the first touch operation; and displaying, in a movement process of the virtual summoned object in the virtual scene based on the operation information of the first touch operation and in response to a second touch operation on the character controlling control, that a virtual character performs a behavior action corresponding to the character controlling control.

In yet another aspect, the present disclosure provides a virtual object control apparatus, the apparatus including: a first display module, configured to display a first scene picture in a virtual scene interface used for presenting a virtual scene, the first scene picture being a picture of the virtual scene observed from a viewing angle corresponding to a virtual summoned object in the virtual scene, the virtual scene interface including a summoned object controlling control and a character controlling control; a first control module, configured to display, in response to a first touch operation on the summoned object controlling control, that the virtual summoned object moves in the virtual scene based on operation information of the first touch operation; and a second control module, configured to display, in a movement process of the virtual summoned object in the virtual scene based on operation information of the first touch operation and in response to a second touch operation on the character controlling control, that a virtual character performs a behavior action corresponding to the character controlling control.

In an implementation, before the first display module displays a first scene picture in a virtual scene interface in response to that a virtual summoned object corresponding to a virtual character exists in a virtual scene, the apparatus further includes: a second display module, configured to display a second scene picture in the virtual scene interface in response to that the virtual summoned object corresponding to the virtual character does not exist in the virtual scene, the second scene picture being a picture of the virtual scene observed from a viewing angle corresponding to the virtual character; and a third control module, configured to control, in response to receiving a third touch operation on the summoned object controlling control, the virtual character to summon the virtual summoned object in the virtual scene.

In an implementation, the first display module is configured to switch, in response to receiving a fourth touch operation on the summoned object controlling control, a scene picture in the virtual scene interface from the second scene picture to the first scene picture for displaying, the fourth touch operation being performed after the third touch operation.

In an implementation, the apparatus further includes: a third display module, configured to superimpose and display a thumbnail picture of the second scene picture on an upper layer of the first scene picture, a size of the thumbnail picture being less than a size of the first scene picture.

In an implementation, the apparatus further includes: a switching module, configured to switch display positions of the first scene picture and the second scene picture in response to receiving a picture switching operation.

In an implementation, the apparatus further includes: a restoration module, configured to restore and display the second scene picture in the virtual scene interface in response to that a picture restore condition is met, the picture restore condition including that: a trigger operation on a controlling release control in the virtual scene interface is received; a triggered effect corresponding to the virtual summoned object is triggered; or a duration after the virtual summoned object is summoned reaches a preset valid duration.

In an implementation, the first control module includes: an obtaining submodule, configured to obtain, in response to the first touch operation on the summoned object controlling control, an offset angle of the virtual summoned object relative to an initial direction based on the operation information of the first touch operation; and a control submodule, configured to control a movement direction of the virtual summoned object in the virtual scene according to the offset angle.

In an implementation, the operation information includes a relative direction, the relative direction being a direction of an operation position of the first touch operation relative to a center position of the summoned object controlling control; and the control submodule is configured to: determine a target offset angle of the virtual summoned object relative to the initial direction based on the relative direction; obtain the target offset angle as the offset angle in response to that the target offset angle is within a deflectable angle range; obtain, in response to that the target offset angle is greater than an angle upper limit of the deflectable angle range, the angle upper limit as the offset angle; and obtain, in response to that the target offset angle is less than an angle lower limit of the deflectable angle range, the angle lower limit as the offset angle.

In an implementation, the apparatus further includes: a first presentation module, configured to present an angle indicator pattern corresponding to the virtual summoned object in the first scene picture, the angle indicator pattern being used for indicating the deflectable angle range.

In an implementation, the apparatus further includes: a second presentation module, configured to present an angle indicator identifier in the first scene picture, the angle indicator identifier being used for indicating a movement direction of the virtual summoned object in the first scene picture.

In yet another aspect, the present disclosure provides a non-transitory computer-readable storage medium storing computer program instructions executable by at least one processor to perform: displaying a first scene picture in a virtual scene interface used for presenting a virtual scene, the first scene picture being a picture of the virtual scene observed from a viewing angle corresponding to a virtual summoned object in the virtual scene, the virtual scene interface including a summoned object controlling control and a character controlling control; displaying, in response to a first touch operation on the summoned object controlling control, that the virtual summoned object moves in the virtual scene based on operation information of the first touch operation; and displaying, in a movement process of the virtual summoned object in the virtual scene and in response to a second touch operation on the character controlling control, that a virtual character performs a behavior action corresponding to the character controlling control.

The technical solutions provided in the present disclosure may include the following beneficial effects:

When controlling a virtual summoned object to move in a virtual scene by using a summoned object controlling control, a behavior action of a virtual character in the virtual scene may be directly controlled by using a character controlling control in the virtual scene. Therefore, a plurality of virtual objects may be controlled in a virtual scene at the same time without an additional switching operation, so as to improve control efficiency for a virtual object.

In addition, in this embodiment of the present disclosure, a plurality of virtual objects in a virtual scene may be controlled simultaneously, and therefore, a switching operation for changing a controlled object is reduced, human-machine interaction efficiency is improved, and waste of processing resources and power resources of a terminal is further reduced.

It is to be understood that the general descriptions and the following detailed descriptions are only exemplary and explanatory, and cannot limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
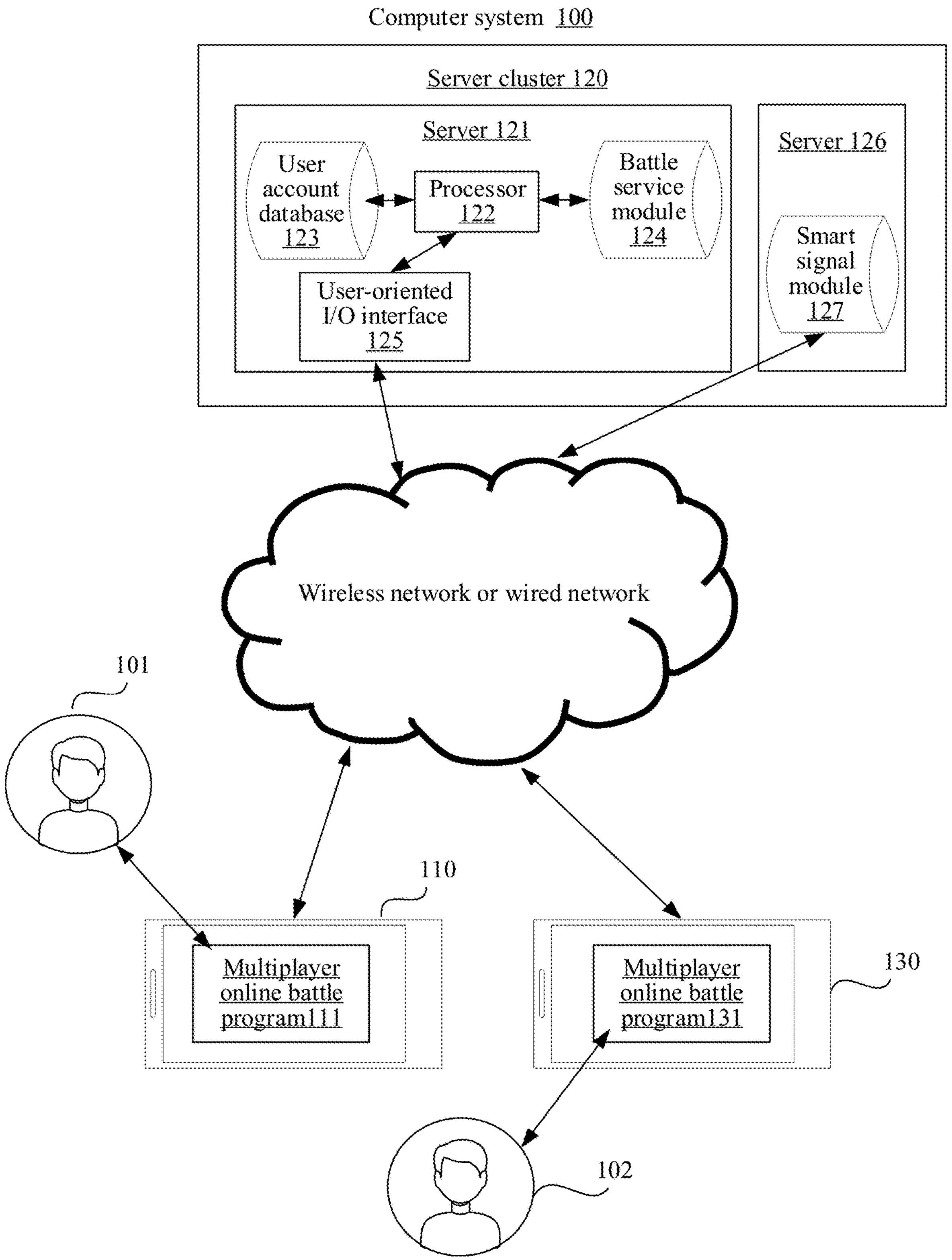
FIG. 1 is a schematic structural block diagram of a computer system according to one or more embodiments of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

In certain embodiments, the term "computer device" is employed herein interchangeably with the term "computing device." The computing device may be a desktop computer, a server, a handheld computer, a smart phone, or the like.

It is to be understood that "a number of" means one or more, and "plurality of" mentioned in the present disclosure means two or more. "And/or" describes an association relationship for associated objects and represents that three relationships may exist. For example, A and/or B may represent the following three implementations: only A exists, both A and B exist, and only B exists. The character "/" generally indicates an "or" relationship between the associated objects.

The present disclosure provides a virtual object control method, which may improve control efficiency for a virtual object. For ease of understanding, several terms involved in the present disclosure are explained below.

1. Virtual Scene

Virtual scene is a scene displayed (or provided) when an application is run on a terminal. The virtual scene may be a simulated environment scene of a real world, or may be a semi-simulated semi-fictional three-dimensional (3D) environment scene, or may be an entirely fictional 3D environment scene. The virtual scene may be any one of a two-dimensional virtual scene, a 2.5-dimensional virtual scene, and a 3D virtual scene, and description is made by using an example in which the virtual scene is a 3D virtual scene in the following embodiments, but this is not limited. In certain embodiments, the virtual scene is further used for a virtual scene battle between at least two virtual characters. In certain embodiments, the virtual scene further has virtual resources that may be used for at least two virtual characters. In certain embodiments, a map is displayed in a virtual scene interface of the virtual scene. The map may be used for presenting positions of a virtual element and/or a virtual character in a virtual scene, or may be used for presenting states of a virtual element and/or a virtual character in a virtual scene. In certain embodiments, the virtual scene includes a square map. The square map includes a lower left corner region and an upper right corner region that are symmetrical. Virtual characters on two opposing camps occupy the regions respectively, and the objective of each side is to destroy a target building/fort/base/crystal deep in the opponent's region to win victory.

2. Virtual Character

Virtual character is a movable object in the virtual scene. The movable object may be at least one of a virtual human, a virtual animal, and an animated human character. In certain embodiments, when the virtual scene is a 3D virtual scene, the virtual character may be a 3D model. Each virtual character has a shape and a volume in the 3D virtual scene, and occupies some space in the 3D virtual scene. In certain embodiments, the virtual character is a 3D character constructed based on 3D human skeleton technology. The virtual character wears different skins to implement different appearances. In some implementations, the virtual character may also be implemented by using a 2.5-dimensional model or a two-dimensional model, which is not limited in the embodiments of the present disclosure.

3. Multiplayer Online Battle Arena (MOBA)

MOBA is an arena game in which different virtual teams on at least two opposing camps occupy respective map regions on a map provided in a virtual scene, and compete against each other using specific victory conditions as goals. The victory condition includes, but is not limited to: occupying forts or destroy forts of the opposing camps, killing virtual characters in the opposing camps, surviving in a specified scenario and time, seizing a specific resource, and outscoring the opposing camp within a specified time. The battle arena game may take place in rounds. The same map or different maps may be used in different rounds of the battle arena game. Each virtual team includes one or more virtual characters, for example, 1 virtual character, 3 virtual characters, or 5 virtual characters.

4. MOBA Game

MOBA game is a game in which a number of forts are provided in a virtual world, and users on different camps control virtual characters to battle in the virtual world, occupy forts or destroy forts of the opposing camp. For example, in the MOBA game, the users may be divided into two opposing camps. The virtual characters controlled by the users are scattered in the virtual world to compete against each other, and the victory condition is to destroy or occupy all enemy forts. The MOBA game takes place in rounds. A duration of a round of the MOBA game is from a time point at which the game starts to a time point at which the victory condition is met.

5. Controlling Control

The controlling includes a character controlling control and a summoned object controlling control.

The character controlling control is preset in a virtual scene and is configured to control a controllable virtual character in the virtual scene.

The summoned object controlling control is preset in a virtual scene and is configured to control a virtual summoned object in the virtual scene. The virtual summoned object may be a virtual thing generated by a virtual character triggering a skill, for example, the virtual summoned object may be a virtual arrow or a virtual missile.

In certain embodiments, the virtual summoned object may also be a virtual prop provided in a virtual scene, and alternatively, may also be a controllable unit (for example, a monster or a creep) in a virtual scene.

FIG. 1 is a structural block diagram of a computer system according to an exemplary embodiment of the present disclosure. The computer system 100 includes: a first terminal 110, a server cluster 120, and a second terminal 130.

A client 111 supporting a virtual scene is installed and run on the first terminal 110, and the client 111 may be a multiplayer online battle program. When the first terminal runs the client 111, a user interface (UI) of the client 111 is displayed on a screen of the first terminal 110. The client may be any one of a military simulation program, a MOBA game, a battle royale shooting game, and a simulation game (SLG). In this embodiment, an example in which the client is a client of a MOBA game is used for description. The first terminal 110 is a terminal used by a first user 101. The first user 101 uses the first terminal 110 to control a first virtual character located in a virtual scene to perform activities, and the first virtual character may be referred to as a master virtual character of the first user 101. The activities of the first virtual character include, but are not limited to: adjusting body postures, crawling, walking, running, riding, flying jumping, driving, picking-up, shooting, attacking, and throwing. For example, the first virtual character is a first virtual human, for example, a simulated human character or an animated human character.

A client 131 supporting a virtual scene is installed and run on the second terminal 130, and the client 131 may be a multiplayer online battle program. When the second terminal 130 runs the client 131, a UI of the client 131 is displayed on a screen of the second terminal 130. The client may be any one of a military simulation program, a MOBA game, a battle royale shooting game, and an SLG. In this embodiment, an example in which a client is a MOBA game is used for description. The second terminal 130 is a terminal used by a second user 102. The second user 102 uses the second terminal 130 to control a second virtual character located in a virtual scene to perform activities, and the second virtual character may be referred to as a master virtual character of the second user 102. For example, the second virtual character is a second virtual human, for example, a simulated human character or an animated human character.

In certain embodiments, the first virtual human and the second virtual human are located in the same virtual scene. In certain embodiments, the first virtual human and the second virtual human may belong to the same camp, the same team, or the same organization, are friends, or have a temporary communication permission. In certain embodiments, the first virtual human and the second virtual human may belong to different camps, different teams, or different organizations, or are enemies to each other.

In certain embodiments, the client installed on the first terminal 110 is the same as the client installed on the second terminal 130, or the clients installed on the two terminals are clients of the same type on different operating system platforms (Android system or iOS system). The first terminal 110 may generally refer to one of a plurality of terminals, and the second terminal 130 may generally refer to another one of the plurality of terminals. In this embodiment, the first terminal 110 and the second terminal 130 are merely used as an example for description. The first terminal 110 and the second terminal 130 are of the same or different device types, and the device type includes at least one of a smartphone, a tablet computer, an e-book reader, a moving picture experts group audio layer III (MP3) player, a moving picture experts group audio layer IV (MP4) player, a laptop, and a desktop computer.

The first terminal 110, the second terminal 130, and the another terminal 140 are connected to the server cluster 120 by a wireless network or a wired network.

The server cluster 120 includes at least one of one server, a plurality of servers, a cloud computing platform, and a virtualization center. The server cluster 120 is configured to provide a background service for a client supporting a 3D virtual scene. In certain embodiments, the server cluster 120 is responsible for primary computing work, and the terminal is responsible for secondary computing work; or the server cluster 120 is responsible for secondary computing work, and the terminal is responsible for primary computing work; or the server cluster 120 and the terminals perform collaborative computing by using a distributed computing architecture among each other.

In a schematic example, the server cluster 120 includes a server 121 and a server 126. The server 121 includes a processor 122, a user account database 123, a battle service module 124, and a user-oriented input/output (I/O) interface 125. The processor 122 is configured to load instructions stored in the server 121, and process data in the user account database 121 and the battle service module 124. The user account database 121 is configured to store data of user accounts used by the first terminal 110, the second terminal 130, and the other terminals 140, for example, avatars of the user accounts, nicknames of the user accounts, battle effectiveness indexes of the user accounts, and service zones of the user accounts. The battle service module 124 is configured to provide a plurality of battle rooms for the users to battle, for example, a 1V1 battle room, a 3V3 battle room, a 5V5 battle room, and the like. The user-oriented I/O interface 125 is configured to establish communication between the first terminal 110 and/or the second terminal 130 via a wireless network or a wired network for data exchange. In certain embodiments, a smart signal module 127 is disposed in the server 126, and the smart signal module 127 is configured to implement a virtual image presentation method for a virtual object provided in the following embodiment.

Figure 2:
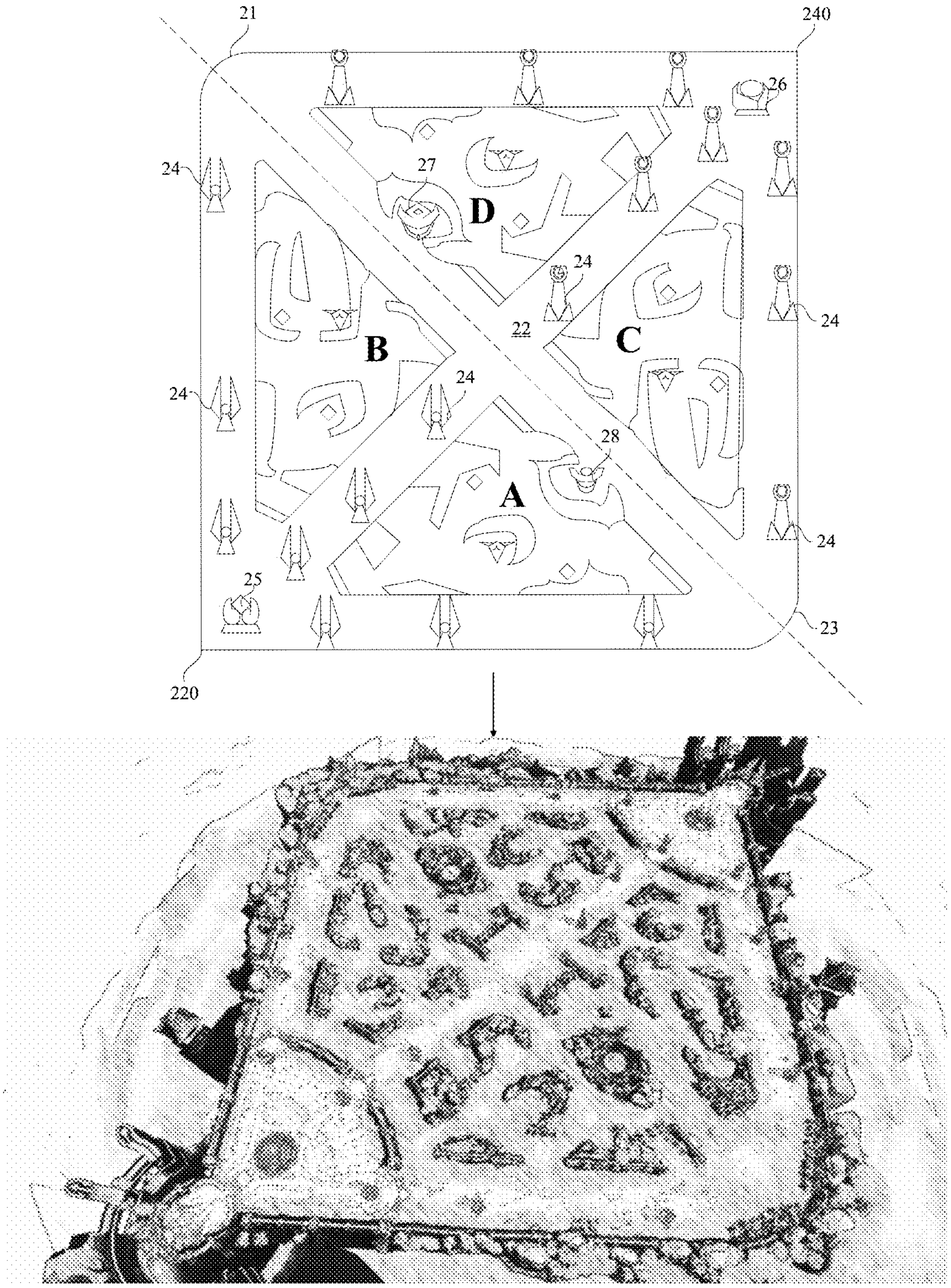
FIG. 2 is a schematic diagram of a map provided in a MOBA game virtual scene according to one or more embodiments of the present disclosure.

FIG. 2 is a schematic diagram of a map provided in a MOBA game virtual scene according to an exemplary embodiment of the present disclosure. The map 200 is in the shape of a square. The map 200 is divided diagonally into a lower left triangular region 220 and an upper right triangular region 240. There are three lanes from a lower left corner of the lower left triangular region 220 to an upper right corner of the upper right triangular region 240: a top lane 21, a middle lane 22, and a bottom lane 23. In a round of battle, 10 virtual characters may be needed, which are divided into two camps to battle. 5 virtual characters in a first camp occupy the lower left triangular region 220, and 5 virtual characters in a second camp occupy the upper right triangular region 240. A victory condition for the first camp is to destroy or occupy all forts of the second camp, and a victory condition for the second camp is to destroy or occupy all forts of the first camp.

For example, the forts of the first camp include 9 turrets 24 and a first base 25. Among the 9 turrets 24, there are respectively 3 turrets on the top lane 21, the middle lane 22, and the bottom lane 23. The first base 25 is located at the lower left corner of the lower left triangular region 220.

For example, the forts of the second camp include 9 turrets 24 and a second base 26. Among the 9 turrets 24, there are respectively 3 turrets on the top lane 21, the middle lane 22, and the bottom lane 23. The second base 26 is located at the upper right corner of the upper right triangular region 220.

A position in which a dashed line is located in FIG. 2 may be referred to as a river channel region. The river channel region is a common region of the first camp and the second camp, and is also a border region between the lower left triangular region 220 and the upper right triangular region 240.

The MOBA game requires the virtual characters to obtain resources in the map 200 to improve combat capabilities of the virtual characters. The resources include:

1. Creeps periodically appear on the top lane 21, the middle lane 22, and the bottom lane 23. When a creep is killed, a virtual character nearby obtains experience values and gold coins.

2. The map may be divided into 4 triangular regions A, B, C, and D by the middle lane (a diagonal line from the lower left corner to the upper right corner) and the river channel region (a diagonal line from an upper left corner to a lower right corner) as division lines. Monsters are periodically refreshed in the 4 triangular regions A, B, C, and D, and when a monster is killed, a virtual character nearby obtains experience values, gold coins, and BUFF effects.

3. A big dragon 27 and a small dragon 28 are periodically refreshed at two symmetric positions in the river channel region. When the big dragon 27 and the small dragon 28 are killed, each virtual character in a killer party camp obtains experience values, gold coins, and BUFF effects. The big dragon 27 may be referred to as a "dominator", a "Caesar", or other names, and the small dragon 28 may be referred to as a "tyrant", a "magic dragon", or other names.

In an example, the top lane and the bottom lane of the river channel each have a gold coin monster, which appears at the 30th second of the game. After the gold coin monster is killed, a virtual character nearby obtains gold coins, and the gold coin monster is refreshed after 70 seconds.

Region A has a red BUFF, two normal monsters (a pig and a bird), and a tyrant (a small dragon). The red BUFF and the monsters appear at the 30th second of the game, the normal monsters are refreshed after 70 seconds upon being killed, and the red BUFF is refreshed after 90 seconds upon being killed.

The tyrant appears at the 2nd minute of the game, and is refreshed after 3 minutes upon being killed. All teammates of the killer obtain gold coins and experience values after the tyrant is killed. The tyrant falls into darkness at the 9th minute and 55th second, and a dark tyrant appears at the 10th minute. A revenge BUFF of the tyrant is obtained by a virtual character who kills the dark tyrant.

Region B has a blue BUFF and two normal monsters (a wolf and a bird). The blue BUFF also appears at the 30th second and is refreshed after 90 seconds upon being killed.

Region C is the same as the region B, has a blue BUFF and two normal monsters (a wolf and a bird). Similarly, the blue BUFF also appears at the 30th second and is refreshed after 90 seconds upon being killed.

Region D is similar to the region A, has a red BUFF and two normal monsters (a pig and a bird). The red BUFF is also used for output increase and deceleration. There is also a dominator (a big dragon). The dominator appears at the 8th minute of the game and is updated after 5 minutes upon being killed. A dominator BUFF, a fetter BUFF, and dominate pioneers (sky dragons (also referred to as a bone dragon) that are manually summoned) on the lanes may be obtained after the dominator is killed.

In an example, the BUFFS are explained in detail:

The red BUFF lasts for 70 seconds and carries continuous burning injuries and deceleration with an attack.

The blue BUFF lasts for 70 seconds, may shorten a cooling time and help to recover mana additionally every second.

The dark tyrant BUFF and the fetter BUFF are obtained after the dark tyrant is killed.

The dark tyrant BUFF increases physical attacks (80+5% of a current attack) for the whole team and increase magic attacks (120+5% of a current magic attack) for the entire team for 90 seconds.

The fetter BUFF reduces an output for the dominator by 50%, and the fetter BUFF does not disappear when the virtual character is killed and lasts for 90 seconds.

The dominator BUFF and the fetter BUFF can be obtained by killing the dominator.

The dominator may improve life recover and mana recover for the whole team by 1.5% per second and last for 90 seconds. The dominator BUFF disappears when the virtual character is killed.

The fetter BUFF reduces an output for the dark tyrant by 50%, and the fetter BUFF does not disappear when the virtual character is killed and lasts for 90 seconds.

The following benefits may be obtained after the dominator is killed.

1. All the teammates obtain 100 gold coins, and whether a master virtual character has participated in fighting against the dominator or not, the master virtual character obtains effects, including a master virtual character that is in a resurrection CD.

2. From a moment that the dominator is killed, next three waves (three lanes) of creeps of the killer party are replaced with the dominant pioneers (flying dragons). The dominant pioneers are very strong and attack in the three lanes at the same time, which brings a great creep line pressure on the opposing team. The opposing team may need to defense in three lanes. An alarm of the dominant pioneers is shown in the map, and during the alarm, there will be a hint of the number of waves of the coming dominant pioneers (usually three waves).

The combat capabilities of the 10 virtual characters include two parts: level and equipment. The level is obtained by using accumulated experience values, and the equipment is purchased by using accumulated gold coins. The 10 virtual characters may be obtained by matching 10 user accounts online by a server. For example, the server matches 2, 6, or 10 user accounts online for competition in the same virtual world. The 2, 6, or 10 virtual characters are on two opposing camps. The two camps have the same quantity of corresponding virtual characters. For example, there are 5 virtual characters on each camp. Types of the 5 virtual characters may be a warrior character, an assassin character, a mage character, a support (or meat shield) character, and an archer character respectively.

The battle may take place in rounds. The same map or different maps may be used in different rounds of battle. Each camp includes one or more virtual characters, for example, 1 virtual character, 3 virtual characters, or 5 virtual characters.

There are usually a plurality of virtual controls preset in a virtual scene, generally including a character controlling control and a skill controlling control. The character controlling control is configured to control a movement of a virtual character in a virtual scene, including changing a movement direction, a movement speed, or the like of the virtual character. The skill controlling control is configured to control a virtual character to cast a skill, adjust a skill casting direction, summon a virtual prop, or the like in a virtual scene.

In certain embodiments, a summoned object controlling control in this embodiment of the present disclosure is one of skill controlling controls, and is configured to control a virtual summoned object. The virtual summoned object is a virtual object, whose movement path can be controlled in a virtual scene, triggered by a summoned object controlling control. That is, after being triggered in the virtual scene, the virtual summoned object may move a certain distance in the virtual scene. During a movement process of the virtual summoned object, a user may adjust a movement direction of the virtual summoned object to change a movement path of the virtual summoned object.

Figure 3:
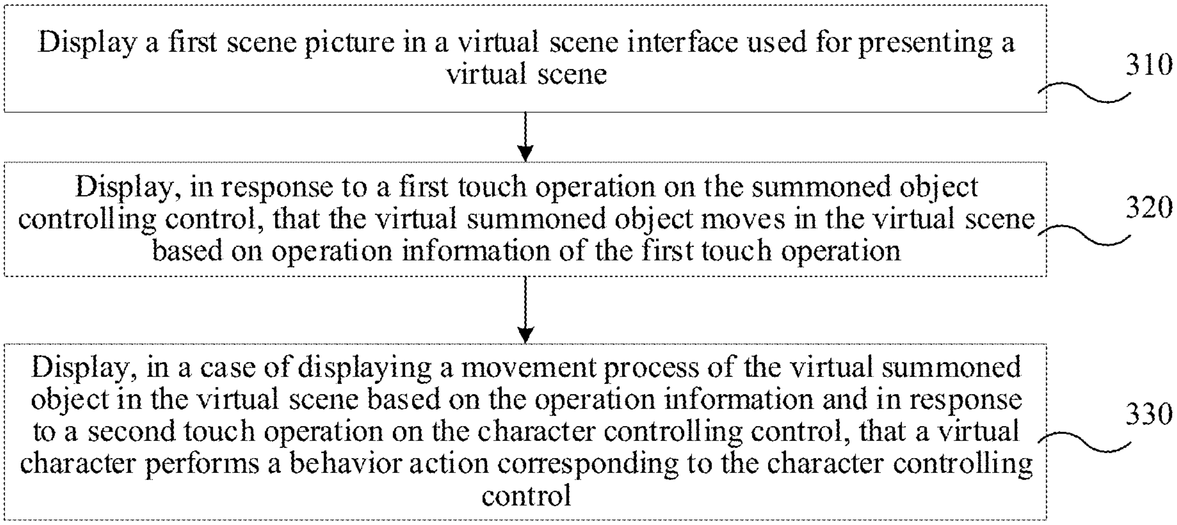
FIG. 3 is a schematic flowchart of a virtual object control method according to one or more embodiments of the present disclosure.

During using the virtual summoned object, if the user desires to change the movement path of the virtual summoned object, the user may need to observe the virtual scene from a viewing angle corresponding to the virtual summoned object to determine an angle in which the virtual summoned object may need to deflect, so as to adjust the movement path of the virtual summoned object. In addition, the user may also need to control a virtual character using the virtual summoned object. Therefore, the present disclosure provides a virtual object control method which may control a virtual character and a virtual prop at the same time. FIG. 3 is a flowchart of a virtual object control method according to an exemplary embodiment of the present disclosure. The virtual object control method may be performed by a terminal (for example, the client in the terminal), or may be performed by a server, or may be performed interactively by a terminal and a server. The terminal and the server may be the terminal and the server in a system shown in FIG. 1. As shown in FIG. 3, the virtual object control method includes the following steps (310 to 330):

Step 310: Display a first scene picture in a virtual scene interface used for presenting a virtual scene.

In certain embodiments, the first scene picture is a picture of the virtual scene observed from a viewing angle corresponding to a virtual summoned object in the virtual scene, and the virtual scene interface includes a summoned object controlling control and a character controlling control. In some embodiments, the first scene picture is displayed when or in response to determining that there is a summoned object corresponding to a virtual character in the virtual scene, and a virtual summoned object is displayed in the first scene picture. In certain embodiments, the viewing angle corresponding to the virtual summoned object focuses on the virtual summoned object and is a viewing angle from which the virtual summoned object can be observed. In certain embodiments, the viewing angle corresponding to the virtual summoned object is a viewing angle of observing the virtual summoned object from above or obliquely above the virtual summoned object.

In this embodiment of the present disclosure, controllable virtual objects may include a movable virtual character in the virtual scene, and a controllable virtual summoned object in the virtual scene.

In certain embodiments, the summoned object controlling control may be configured to summon and control a virtual summoned object, and the summoned object controlling control is one of skill controlling controls in the virtual scene interface. The character controlling control is configured to control a virtual character to perform a corresponding behavior action in the virtual scene, for example, to move or cast a skill.

Figure 4:
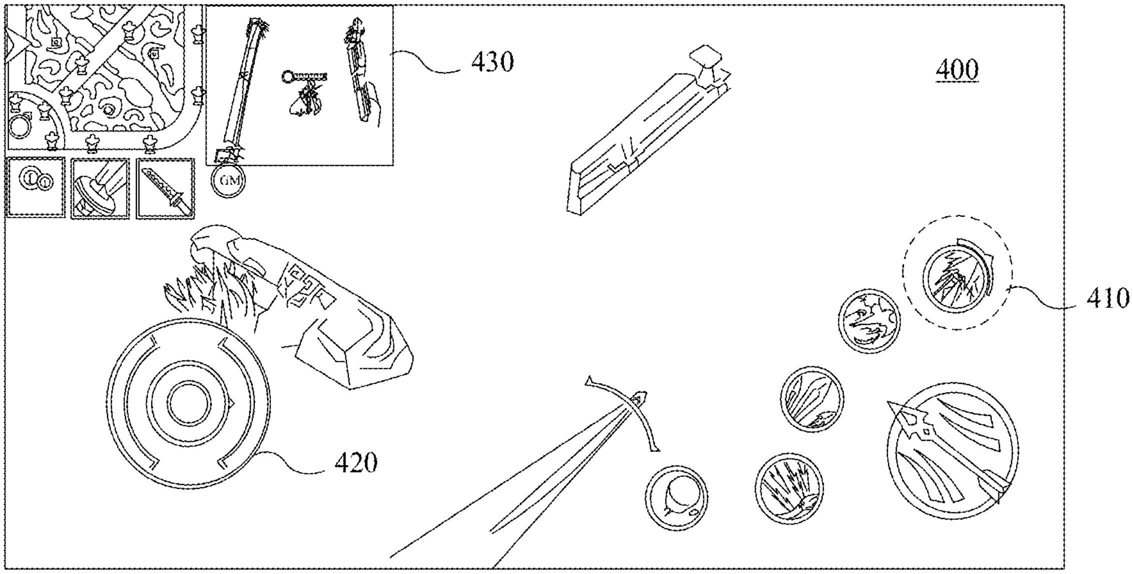
FIG. 4 is a schematic diagram of a first scene picture according to one or more embodiments of the present disclosure.

FIG. 4 is a schematic diagram of a first scene picture according to an exemplary embodiment of the present disclosure. As shown in FIG. 4, a first scene picture 400 includes a summoned object controlling control 410 and a character controlling control 420. The summoned object controlling control 410 is configured to control a virtual summoned object, and the character controlling control 420 is configured to control a virtual character to move or cast a skill.

In some embodiments, types of skills casted by a virtual character in a virtual scene may be divided into a first skill acting based on a virtual summoned object and a second skill acting not based on a virtual summoned object. For example, the first skill may be a skill to summon a virtual prop, such as, summon a virtual arrow and summon a virtual missile. The second skill may be a skill without summoning a virtual prop, such as Sprint, Anger, and Daze.

Based on the description of the first skill and the second skill, functions of the skill controlling controls may include:

1. Cast a second skill in a facing direction of the virtual character in a virtual environment in response to a touch operation based on a first skill controlling control.

2. Adjust a skill casting direction in response to a touch operation based on a second skill controlling control, to cast a second skill in a determined casting direction. In certain embodiments, the determined casting direction is a direction after the skill casting direction is adjusted.

3. Trigger a first skill in response to a touch operation based on a third skill controlling control, to display a virtual summoned object in a virtual scene, and cast and control the virtual summoned object in a facing direction of the virtual character or a skill casting direction after the adjustment.

When the summoned object controlling control in this embodiment of the present disclosure belongs to the skill controlling control, the summoned object controlling control may be the third skill controlling control.

Step 320: Display, in response to a first touch operation on the summoned object controlling control, that the virtual summoned object moves in the virtual scene based on operation information of the first touch operation.

In an implementation, a viewing angle corresponding to the virtual summoned object may be adjusted according to an orientation of the virtual summoned object, so as to change the first scene picture. The adjustment on the viewing angle corresponding to the virtual summoned object may include raising or lowering the viewing angle corresponding to the virtual summoned object, or adjusting the viewing angle left and right.

Step 330: Display, when or in response to determining of displaying a movement process of the virtual summoned object in the virtual scene based on the operation information and in response to a second touch operation on the character controlling control, that a virtual character performs a behavior action corresponding to the character controlling control.

That is, there is a virtual summoned object in the virtual scene, and when the user controls the virtual summoned object, the user may control the virtual character in the virtual scene at the same time, so as to control a plurality of virtual objects in the same virtual scene at the same time.

According to the virtual object control method provided in this embodiment of the present disclosure, when controlling a virtual summoned object to move in a virtual scene by using a summoned object controlling control, a behavior action of a virtual character in the virtual scene may be controlled by using a character controlling control. Therefore, a plurality of virtual objects may be controlled in a virtual scene at the same time without an additional switching operation, so as to improve control efficiency for a virtual object.

In addition, a plurality of virtual objects in a virtual scene may be controlled simultaneously, and therefore, human-machine interaction efficiency is improved, and waste of processing resources and power resources of a terminal is further reduced.

Figure 5:
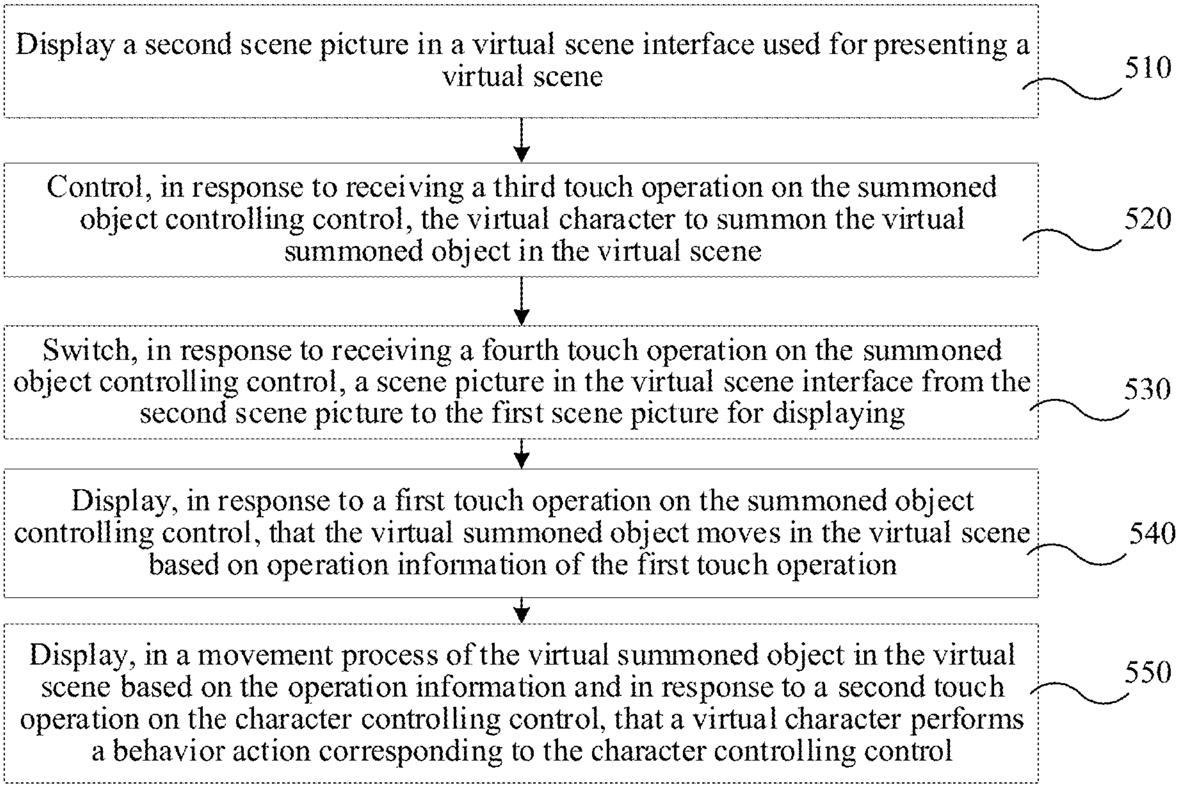
FIG. 5 is a schematic flowchart of a virtual object control method according to one or more embodiments of the present disclosure.

In this embodiment of the present disclosure, the summoned object controlling control may have functions of summoning a virtual summoned object and controlling a virtual summoned object. Based on the functions of the summoned object controlling control, an exemplary embodiment of the present disclosure provides a virtual object control method. FIG. 5 is a flowchart of a virtual object control method according to an exemplary embodiment of the present disclosure. The virtual object control method may be performed by a terminal (for example, the client in the terminal), or may be performed by a server, or may be performed interactively by a terminal and a server. The terminal and the server may be the terminal and the server in a system shown in FIG. 1. As shown in FIG. 5, the virtual object control method includes the following steps (510 to 550):

Step 510: Display a second scene picture in a virtual scene interface used for presenting a virtual scene.

In some embodiments, the second scene picture is a picture of the virtual scene observed from a viewing angle corresponding to the virtual character. The second scene picture is displayed in the virtual scene interface when or in response to determining that there is no virtual summoned object corresponding to a virtual character in the virtual scene (that is, after the virtual summoned object disappears from the virtual scene), and a virtual character is displayed in the second scene picture. The viewing angle corresponding to the virtual summoned object and the viewing angle corresponding to the virtual character are two different viewing angles. In certain embodiments, the viewing angle corresponding to the virtual character focuses on the virtual character and is a viewing angle from which the virtual character can be observed. In certain embodiments, the viewing angle corresponding to the virtual character is a viewing angle of observing the virtual character from above or diagonally the virtual character.

Figure 6:
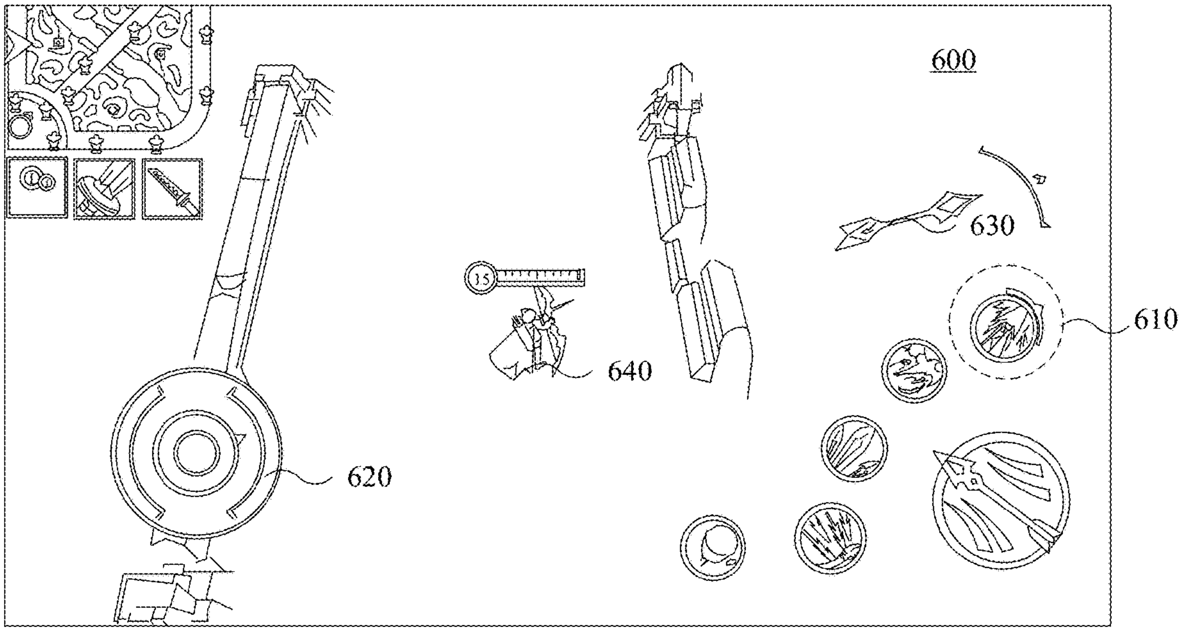
FIG. 6 is a schematic diagram of a second scene picture according to one or more embodiments of the present disclosure.

The first scene picture and the second scene picture may be pictures obtained by observing the same virtual scene from different viewing angles. As shown in FIG. 4, a scene picture in a virtual scene interface 400 is the first scene picture, and is a picture obtained by observing the virtual scene from a viewing angle of a virtual summoned object 430. The first scene picture changes along with a movement of the virtual summoned object in the virtual scene. FIG. 6 is a schematic diagram of a second scene picture according to an exemplary embodiment of the present disclosure. As shown in FIG. 6, a scene picture in a virtual scene interface 600 is a picture obtained by observing the virtual scene from a viewing angle of a virtual character 640. The second scene picture changes along with a movement of the virtual character in the virtual scene.

A virtual control in a virtual scene interface may control a virtual character through mapping, for example, by rotating a virtual control to control the virtual character to turn around. An orientation of the virtual character and an orientation of a wheel of the virtual control have a mapping relationship. As shown in FIG. 6, the virtual control includes a summoned object controlling control 610 and a character controlling control 620. An orientation of a wheel of the summoned object controlling control indicates an orientation of a virtual summoned object 630, and an orientation of a wheel of the character controlling control indicates an orientation of a virtual character 640. When the user performs a rotation operation based on the virtual control to change an orientation of the virtual character, the orientation of the virtual character in the virtual scene changes in a manner consistent with that of the virtual control. As shown in FIG. 6, an orientation of the summoned object controlling control 610 is an upper right direction, and an orientation of the virtual summoned object 630 is also an upper right direction. An orientation of a wheel of the character controlling control 620 is an upper right direction, and an orientation of the virtual character 640 is also an upper right direction. If the orientation of the wheel of the character controlling control 620 rotates clockwise from the upper right direction to a right direction, the orientation of the virtual character 640 also rotates clockwise from the upper right direction to a right direction. If the orientation of the wheel of the summoned object controlling control 610 rotates anticlockwise from the upper right direction to an upper direction, the orientation of the virtual summoned object 630 also rotates counterclockwise from the upper right direction to an upper direction.

Step 520: Control, in response to receiving a third touch operation on the summoned object controlling control, the virtual character to summon the virtual summoned object in the virtual scene.

In an implementation, the virtual summoned object may be a virtual object summoned by the virtual character through a skill corresponding to the summoned object controlling control.

In an implementation, the virtual summoned object may alternatively be a monster in a virtual environment, for example, the virtual character may transform the monster into a virtual summoned object by using a special skill. Alternatively, the virtual summoned object may also be a virtual prop applied in a virtual environment, for example, when the virtual character touches the virtual prop, the virtual prop may be transformed into a virtual summoned object.

When the virtual summoned object is a monster in a virtual environment, the third touch operation may be an operation of clicking a summoned object controlling control after the user selects the monster.

In this embodiment of the present disclosure, an example in which the virtual summoned object is a virtual object summoned by using a skill corresponding to the summoned object controlling control is used for describing the present disclosure.

In an implementation, the third touch operation may be an operation of clicking a summoned object controlling control. Alternatively, the third touch operation is a touch operation starting from a first region within a range of a summoned object controlling control and ending at a second region within the range of the summoned object controlling control, and both a starting process and an ending process of the touch operation are not beyond the range of the summoned object controlling control. That is, after confirming an initial casting direction of the virtual summoned object by using the summoned object controlling control, the virtual summoned object is casted in a determined initial casting direction.

Step 530: Switch, in response to receiving a fourth touch operation on the summoned object controlling control, a scene picture in the virtual scene interface from the second scene picture to the first scene picture for displaying.

The fourth touch operation is performed after the third touch operation.

In an implementation, after receiving a third touch operation based on the summoned object controlling control and controlling the virtual character to summon a virtual summoned object in a virtual scene in response to the third touch operation, a function of the summoned object controlling control may change. That is, before the third touch operation is received, a function of the summoned object controlling control may be to summon a virtual summoned object, and after the third touch operation is received, a function of the summoned object controlling control may be switched to a function to control a virtual summoned object. In this implementation, the virtual summoned object is controlled to move in the virtual scene in response to receiving a fourth touch operation based on the summoned object controlling control. In addition, the scene picture in the virtual scene interface is switched from the second scene picture obtained by observing the virtual scene from the viewing angle corresponding to the virtual character to the first scene picture obtained by observing the virtual scene from the viewing angle corresponding to the virtual summoned object.

In an implementation, the fourth touch operation may be a press operation lasting longer than a preset value performed based on a certain region in a range of the summoned object controlling control.

In an implementation, in a process of switching from the second scene picture to the first scene picture, a transition picture may be provided. The transition picture is configured to represent a change of an observing viewing angle, and the transition may be a smooth transition.

To ensure that the user has enough prejudgment space and field of view for a virtual object, when displaying a virtual scene interface, the virtual object is usually located at a lower left corner of the virtual scene. Therefore, when a viewing angle of observing the virtual scene is switched from a viewing angle corresponding to the virtual character to a viewing angle corresponding to the virtual summoned object, lens of a 3D virtual space is adjusted. The lens automatically raises to a certain angle, and an anchor point of the lens is place before the virtual summoned object, so that the virtual summoned object is located at a lower left corner (for example, a lower left region) of the virtual scene.

In an implementation, a thumbnail picture of the second scene picture is superimposed and displayed on an upper layer of the first scene picture, a size of the thumbnail picture being less than a size of the first scene picture.

In this embodiment of the present disclosure, the thumbnail picture of the second scene picture is displayed on the upper layer of the first scene picture in a floating window manner. That is, for the same terminal user, both the first scene picture and the second scene picture may be seen in a terminal interface. The thumbnail picture of the second scene picture is a picture formed by scaling the second scene picture down in equal proportion, and picture content of the second scene picture also changes according to operations of the user.

In certain embodiments, the thumbnail picture of the second scene picture may be a thumbnail picture of all picture regions in the second scene picture. Alternatively, the thumbnail picture of the second scene picture may also be a thumbnail picture of a part of picture regions in which the virtual character is located in the second scene picture. In this implementation, a virtual scene range presented in the thumbnail picture of the second scene picture is less than a virtual scene range presented in the second scene picture.

In an implementation, a display region of the second scene picture may be a preset fixed region, or may be located at any position in the first scene picture. When the display region of the second scene picture may be located at any position in the first scene picture, the user may change a position of the display region of the second scene picture by using an interaction operation with the display region of the second scene picture.

An example in which the display region of the second scene picture is located at an upper left corner of the first scene picture is used in this embodiment of the present disclosure. As shown in FIG. 4, a second scene picture 430 is presented at an upper left corner of the first scene picture 400.

In an implementation, the transmittance of the second scene picture may be preset when the second scene picture is superimposed and displayed at the first scene picture. Alternatively, a transmittance adjustment control may be set in the virtual scene interface. The transmittance adjustment control may adjust the transmittance of the second scene picture by receiving a touch operation of the user. For example, when the second scene picture is superimposed and displayed on an upper layer of the first scene picture, the transmittance of the second scene picture is 0%. The user may move the transmittance adjustment control upward to increase the transmittance of the second scene picture. Therefore, a first scene picture can be presented when viewing the second scene picture. Alternatively, the transmittance adjustment control is moved downward to reduce the transmittance of the second scene picture.

In an implementation, based on that the display region of the second scene picture is less than the display region of the first scene picture, a size of the display region of the second scene picture may be adjusted. In certain embodiments, a size of the display region refers to a dimension of the display region.

In an implementation, when the display region of the second scene picture is superimposed on the first scene picture, a size of the display region of the second scene picture is a preset value, and the user may adjust, according to the user's requirements, a size of the display region of the first scene picture occupied by the display region of the second scene picture. For example, when the display region of the second scene picture is superimposed on the first scene picture, the display region of the second scene picture is a quarter of the display region of the first scene picture. The user may scale down or up the size of the display region of the second scene picture by using a preset gesture. The preset gesture may be two fingers touching the second scene picture and sliding towards or away from each other.

The adjustment method for the transmittance and the size of the display region of the second scene picture is merely an example, and an adjustment method for the transmittance and the size of the display region of the second scene picture is not limited in the present disclosure.

Step 540: Display, in response to a first touch operation on the summoned object controlling control, that the virtual summoned object moves in the virtual scene based on operation information of the first touch operation.

In an implementation, the first touch operation may be a touch operation starting from a first region acted by the fourth touch operation and ending at a second region within the range of the summoned object controlling control, and both a starting process and an ending process of the touch operation are not beyond the range of the summoned object controlling control. That is, the movement direction of the virtual summoned object in the virtual scene is changed by using the summoned object controlling control, so as to adjust the movement path of the virtual summoned object.

In an implementation, the displaying, in response to a first touch operation on the summoned object controlling control, that the virtual summoned object moves in the virtual scene based on operation information of the first touch operation includes: obtaining, in response to the first touch operation on the summoned object controlling control, an offset angle of the virtual summoned object relative to an initial direction based on the operation information of the first touch operation; and controlling a movement direction of the virtual summoned object in the virtual scene according to the offset angle.

In an implementation, the operation information includes a relative direction, and the relative direction is a direction of an operation position of the first touch operation relative to a center position of the summoned object controlling control.

The obtaining, in response to the first touch operation on the summoned object controlling control, an offset angle of the virtual summoned object relative to an initial direction based on the operation information of the first touch operation includes: determining a target offset angle of the virtual summoned object relative to the initial direction based on the relative direction; obtaining the target offset angle as the offset angle when or in response to determining that the target offset angle is within a deflectable angle range; obtaining, when or in response to determining that the target offset angle is greater than an angle upper limit of the deflectable angle range, the angle upper limit as the offset angle; and obtaining, when or in response to determining that the target offset angle is less than an angle lower limit of the deflectable angle range, the angle lower limit as the offset angle.

Figure 7:
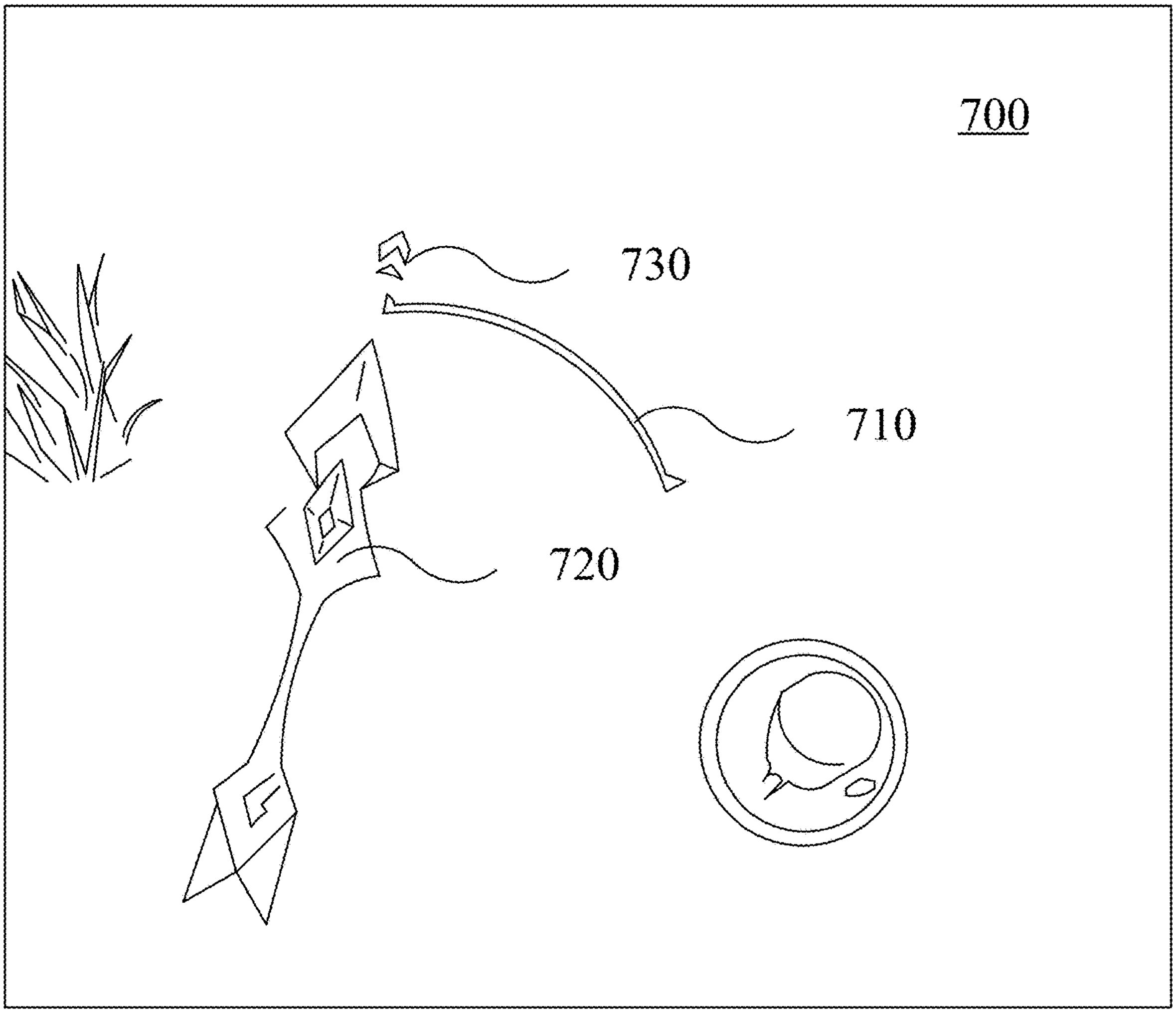
FIG. 7 is a schematic diagram of an angle indicator pattern in a first scene picture according to one or more embodiments of the present disclosure.

In an implementation, an angle indicator pattern corresponding to the virtual summoned object is presented in the first scene picture, and the angle indicator pattern is used for indicating the deflectable angle range. FIG. 7 is a schematic diagram of an angle indicator pattern in a first scene picture according to an exemplary embodiment of the present disclosure. As shown in FIG. 7, an angle indicator pattern 710 is presented in a first scene picture 700, and the angle indicator pattern may indicate a deflectable angle range of a virtual summoned object 720 in a virtual scene. As shown in FIG. 7, the angle indicator pattern may be arc-shaped, and by using an initial direction of the virtual summoned object as a center, two deflectable angle sub-ranges at two sides of the center may be the same.

In an implementation, an angle indicator identifier is presented in the first scene picture, and the angle indicator identifier is used for indicating a movement direction of the virtual summoned object in the first scene picture. As shown in FIG. 7, the first scene picture includes an angle indicator identifier 730. An indicated direction of the angle indicator identifier is consistent with a movement trajectory direction of the virtual summoned object, and a movement range of the angle indicator identifier is consistent with a deflectable angle range of the virtual summoned object indicated by the angle indicator pattern.

A logic for the summoned object controlling control to control an orientation of the virtual summoned object may be implemented as: if a current orientation of the virtual summoned object is the same as a wheel orientation of the summoned object controlling control, the orientation of the virtual summoned object is not changed; if a current orientation of the virtual summoned object is different from a wheel orientation of the summoned object controlling control, and a current offset angle of the virtual summoned object does not reach a maximum offset angle indicated by an angle indicator, the orientation of the virtual summoned object is changed into a direction the same as the wheel orientation of the summoned object controlling control; and in response to that a current orientation of the virtual summoned object is different from a wheel orientation of the summoned object controlling control, and a current offset angle of the virtual summoned object reaches a maximum offset angle indicated by an angle indicator, the orientation of the virtual summoned object is not changed, and the current offset angle of the virtual summoned object remains the maximum offset angle indicated by the angle indicator. That a current offset angle of the virtual summoned object reaches a maximum offset angle indicated by an angle indicator means that the current offset angle of the virtual summoned object is the same as the maximum offset angle indicated by the angle indicator, or a current offset angle of the virtual summoned object exceeds the maximum offset angle indicated by the angle indicator.

Because the virtual summoned object has two offset directions (such as a clockwise direction and a counterclockwise direction, and a direction offsetting to left or a direction offsetting to right) relative to the center position, whether a direction corresponding to the maximum offset angle indicated by the angle indicator reached by the current orientation of the virtual summoned object is the same as a direction of the wheel orientation of the summoned object controlling control is determined in the following manners:

obtaining an initial orientation and a current orientation of the virtual summoned object, and a wheel orientation of the summoned object controlling control; calculating a cross product of the initial orientation and the current orientation of the virtual summoned object, to obtain a sign symbol S1 of an orientation of a Y-axis of a calculation result:

$$S1=\text{Mathf}\cdot\text{Sign}(\text{Vector3}\cdot\text{Cross}(\text{bulletDir},\text{initDir})\cdot y);$$

where bulletDir represents the current direction of the virtual summoned object, initDir represents the initial direction of the virtual summoned object, and Mathf.Sign is a symbol used for returning f, that is, when f is positive or 0, 1 is returned, and when f is negative, −1 is returned; and calculating a cross product of the current orientation of the virtual summoned object and the wheel orientation of the summoned object controlling control, to obtain a sign symbol S2 of an orientation of a Y-axis of a calculation result:

$$S2=\text{Mathf}\cdot\text{Sign}(\text{Vector3}\cdot\text{Cross}(\text{bulletDir},\text{targetDir})\cdot y);$$

where targetDir represents the wheel orientation of the summoned object controlling control.

If S1=S2, and the current offset angle reaches the maximum offset angle, it indicates that the orientation of the maximum deflected angle of the virtual summoned object is the same as the wheel orientation of the summoned object controlling control, and the orientation of the virtual summoned object is not changed; and otherwise, the virtual summoned object is controlled to perform angle deflection to left or right according to the result of S2. For example, when the current orientation of the virtual summoned object reaches the maximum offset angle at the left side of the angle indicator, if the wheel orientation of the summoned object controlling control indicates the virtual summoned object to deflect to left, S1=S2, and the orientation of the virtual summoned object is not changed. If the wheel orientation of the summoned object controlling control indicates the virtual summoned object to deflect to right, S1≠S2, and the orientation of the virtual summoned object deflects to right.

In an implementation, a deflected angle of the virtual summoned object deflects according to a pre-configured deflection speed or a configured deflection speed, and a maximum deflected angle of the virtual summoned object cannot exceed an angle indicated by the wheel orientation of the summoned object controlling control and the maximum offset angle of the angle indicator, that is:

$$\text{turnAngle}=\text{Mathf}\cdot\text{min}(\text{turnSpeed}*\text{deltaTime},\text{targetAngle});$$

where turnAngle represents the offset angle of the virtual summoned object, turnSpeed represents the pre-configured deflection speed, deltaTime represents a duration of a touch operation based on the summoned object controlling control, and targetAngle represents the maximum offset angle indicated by the angle indicator.

In an implementation, the orientation of the angle indicator in the first scene picture may be adjusted according to a current deflected angle of the virtual summoned object, and the angle indicator may be arc-shaped. A logic for calculating the deflected angle of the angle indicator is as follows:

$$\text{indDir}=\text{Quaternion}\cdot\text{AngleAxis}((Ca/Ma)*(Ha/2),\ \text{Vector3}\cdot\text{up})*\text{bulletDir};$$

where indDir represents the deflected angle of the angle indicator, Ca represents the current deflected angle of the virtual summoned object, Ma represents the maximum offset angle indicated by the angle indicator, and Ha represents a half of an arch-shaped angle of the angle indicator.

Step 550: Display, in a movement process of the virtual summoned object in the virtual scene based on the operation information and in response to a second touch operation on the character controlling control, that a virtual character performs a behavior action corresponding to the character controlling control.

In an implementation, after the fourth touch operation performed based on the summoned object controlling control is received and after a touch operation performed based on the character controlling control is received, the virtual character is controlled to move in a part of virtual environment presented in the second scene picture and the virtual summoned object is controlled to move in a part of virtual environment presented in the first scene picture at the same time. That is, the user may control the virtual character and the virtual summoned object at the same time, and display the virtual character and the virtual summoned object by using different virtual scene pictures, so that the user may observe the virtual character and the virtual summoned object at the same time, and predict and operate movements of the virtual character and the virtual summoned object at the same time, so as to increase an observable range of the user and improve accuracy of user control.

Figure 8:
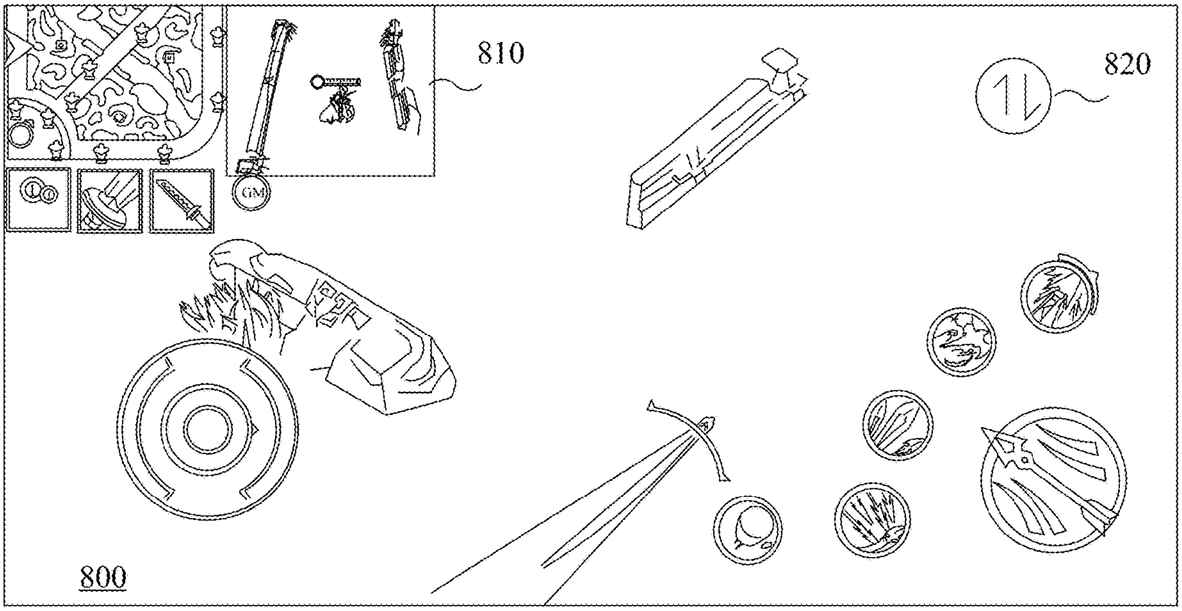
FIG. 8 is a schematic diagram of a virtual scene interface according to one or more embodiments of the present disclosure.

In an implementation, a first scene picture is presented in the virtual scene interface, and after a thumbnail picture of the second scene picture is superimposed and displayed on an upper layer of the first scene picture, display positions of the first scene picture and the second scene picture may be switched in response to receiving a picture switching operation, that is, a thumbnail picture of the first scene picture is superimposed and displayed on an upper layer of the second scene picture. In certain embodiments, the switching the display positions of the first scene picture and the second scene picture refers to exchange the display position of the first scene picture and the display position of the second scene picture. FIG. 8 is a schematic diagram of a virtual scene interface according to an exemplary embodiment of the present disclosure. As shown in FIG. 8, a thumbnail picture 810 of the second scene picture is displayed in a first scene picture 800. In an implementation, a picture switching control 820 may be displayed in the virtual scene interface, and the first scene picture and the second scene picture may be switched in response to receiving a switching operation based on the picture switching control 820. Alternatively, in an implementation, the picture switching operation may be represented as: dragging the second scene picture to the display region of the first scene picture based on a drag operation of the second scene picture, to switch the first scene picture and the second scene picture; or dragging the first scene picture to the display region of the thumbnail picture of the second scene picture based on a drag operation of the first scene picture, to switch the first scene picture and the second scene picture.

In an implementation, the virtual scene interface may be restored to the second scene picture.

The second scene picture is restored and displayed in the virtual scene interface in response to that a picture restore condition is met.

The picture restore condition includes that: a trigger operation on a controlling release control in the virtual scene interface is received; a triggered effect corresponding to the virtual summoned object is triggered; or a duration after the virtual summoned object is summoned reaches a preset valid duration.

Figure 9:
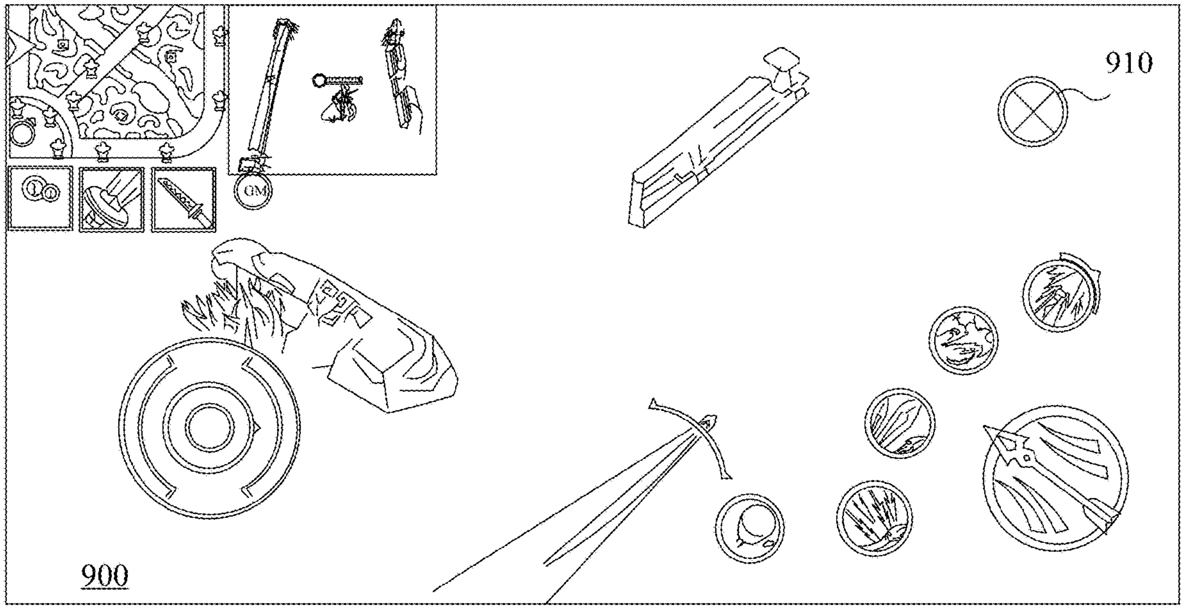
FIG. 9 is a schematic diagram of a first scene picture according to one or more embodiments of the present disclosure.

That is, the virtual scene interface may be restored to the second scene picture in the following implementations:

1. A controlling release control is presented in a virtual scene interface, a first scene picture is closed in response to receiving a touch operation performed on the controlling release control, and the virtual scene interface is restored to the second scene picture. FIG. 9 is a schematic diagram of a first scene picture according to an exemplary embodiment of the present disclosure. As shown in FIG. 9, a virtual scene interface 900 includes a controlling release control 910, and the controlling release control 910 is configured to release a control on a virtual summoned object. When the user performs a touch operation on the controlling release control 910, a control on the virtual summoned object may be released, and a first scene picture obtained by observing the virtual scene from a viewing angle corresponding to the virtual summoned object is closed at the same time.

2. The virtual summoned object has a corresponding triggered effect, the first scene picture is closed in response to that the virtual summoned object plays the corresponding triggered effect, that is, the triggered effect of the virtual summoned object is invalid, and the virtual scene interface is restored to the second scene picture.

3. The virtual summoned object has a preset valid duration after being summoned, and the first scene picture is closed in response to that the preset valid duration of the virtual summoned object ends, and the virtual scene interface is restored to the second scene picture.

Figure 10:
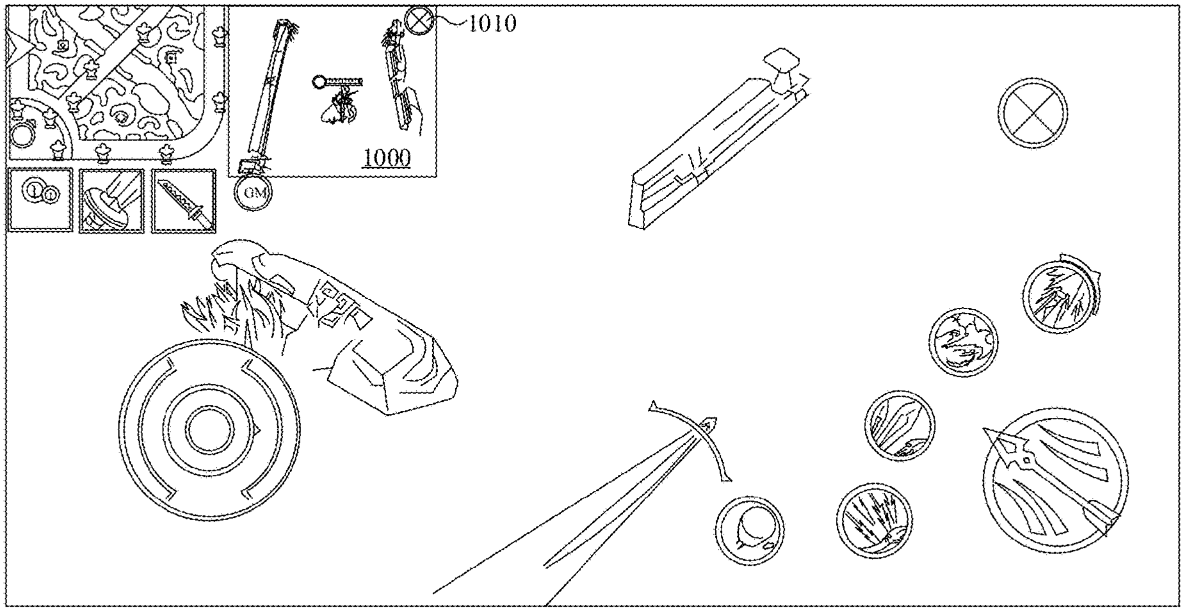
FIG. 10 is a schematic diagram in which a second scene picture is superimposed and displayed on an upper layer of a first scene picture according to one or more embodiments of the present disclosure.

In an implementation, a first scene picture is presented in the virtual scene interface, and after a thumbnail picture of the second scene picture is superimposed and displayed on an upper layer of the first scene picture, the second scene picture is closed in response to receiving a designated operation based on the second scene picture. FIG. 10 is a schematic diagram in which a second scene picture is superimposed and displayed on an upper layer of a first scene picture according to an exemplary embodiment of the present disclosure. As shown in FIG. 10, a virtual scene picture close control 1010 may be presented in a second scene picture 1000, and the user may close the second scene picture by using a touch operation on the close control. Alternatively, a picture close operation may be preset, and the picture close operation may be to click a preset region of the second scene picture, or to perform a double-click operation, a triple-click operation, or the like based on the second scene picture.

Figure 11:
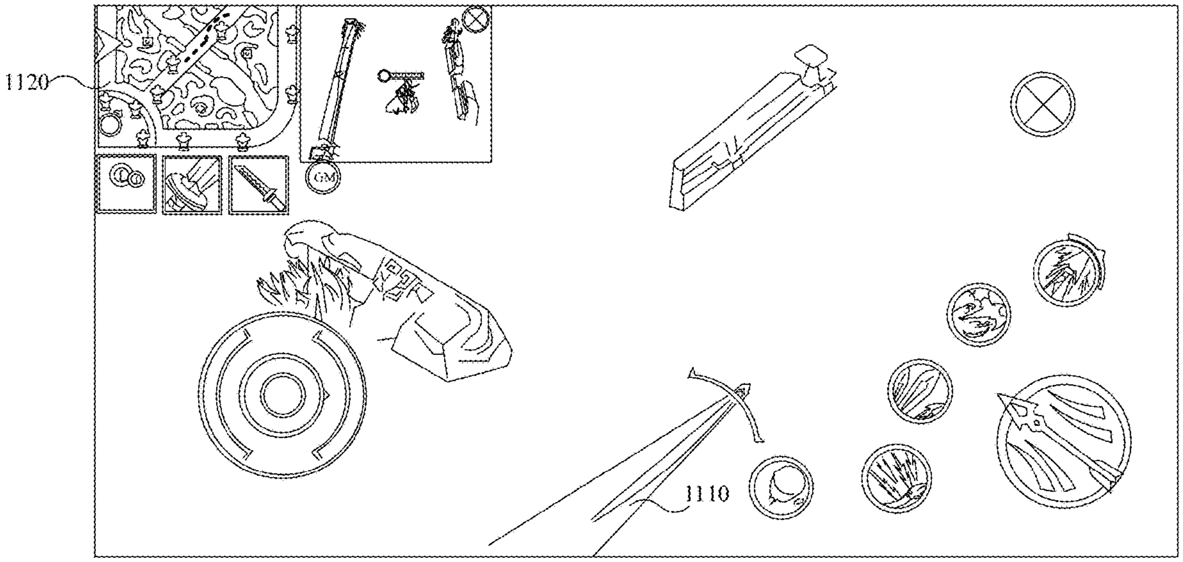
FIG. 11 is a schematic diagram of a virtual scene interface according to one or more embodiments of the present disclosure.

In an implementation, a minimap may be displayed in the virtual scene, and a movement path of the virtual summoned object may be displayed in the minimap. FIG. 11 is a schematic diagram of a virtual scene interface according to an exemplary embodiment of the present disclosure. As shown in FIG. 11, when displaying that the virtual summoned object is moving in the virtual scene in the first virtual picture, a movement trajectory of a virtual summoned object 1110 may be mapped into a minimap 1120 in real time, so that the user can observe a movement path of the virtual summoned object as a whole, and determine the movement path of the virtual summoned object more comprehensively.

According to the virtual object control method in a virtual scene provided in the embodiments of the present disclosure, in an implementation of controlling a virtual summoned object whose movement path may be controlled in the virtual scene, a second scene picture obtained by observing the virtual scene from a viewing angle corresponding to a virtual character and a first scene picture obtained by observing the virtual scene from a viewing angle corresponding to the virtual summoned object are separately displayed in the virtual scene, so that the user may observe a controlled object at different display regions when controlling the virtual character and the virtual summoned object at the same time. Therefore, a plurality of virtual objects in the virtual scene may be controlled simultaneously, so that a switching operation for changing a controlled object is reduced, human-machine interaction efficiency and accuracy for controlling the virtual object are improved, and waste of processing resources and power resources of a terminal is further reduced.

Figure 12:
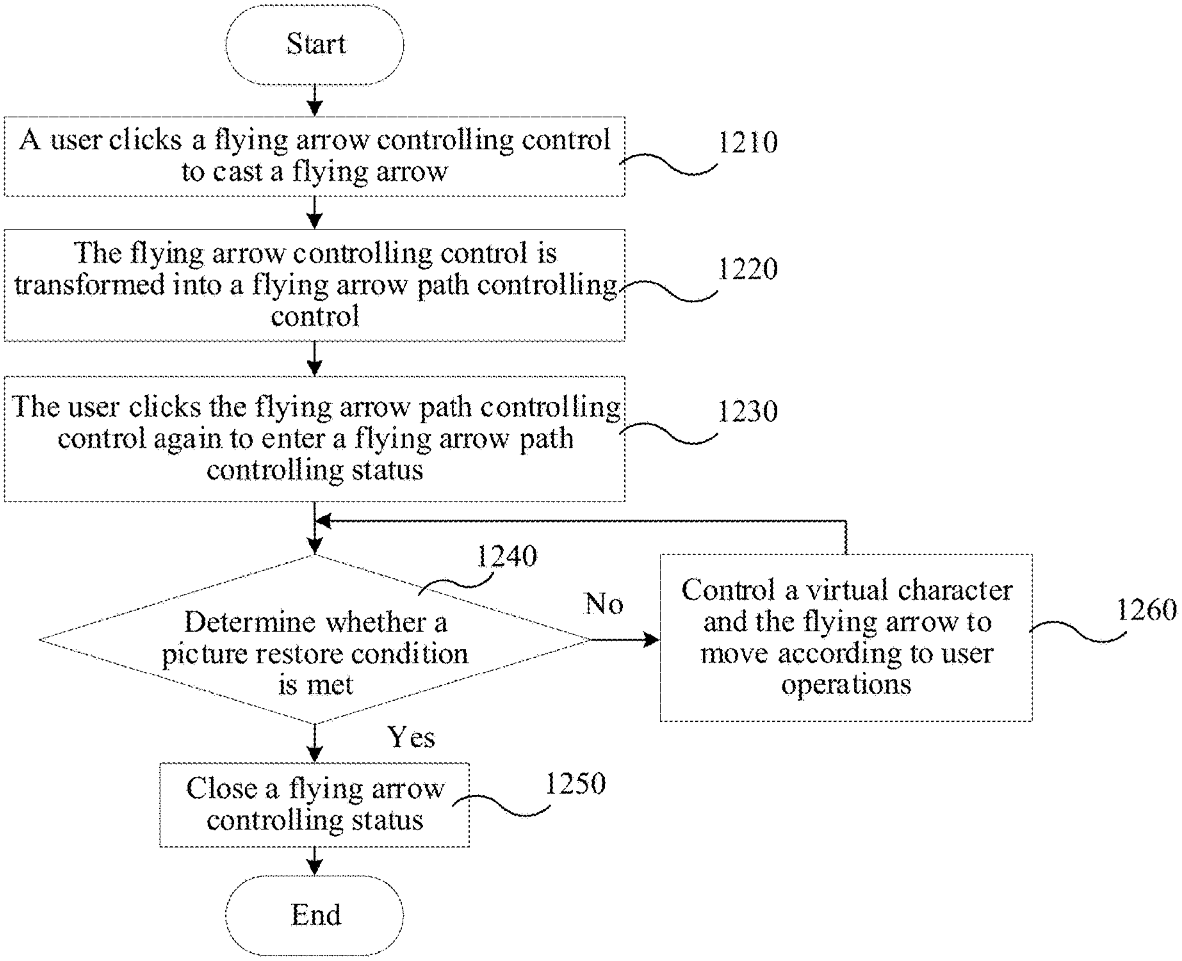
FIG. 12 is a schematic flowchart of a virtual object control method according to one or more embodiments of the present disclosure.

Using a game scene as an example, a virtual summoned object is a flying arrow, and a summoned object controlling control is a flying arrow controlling control. FIG. 12 is a flowchart of a virtual object control method according to an exemplary embodiment of the present disclosure. The virtual object control method may be performed by a terminal (for example, the client in the terminal), or may be performed by a server, or may be performed interactively by a terminal and a server. The terminal and the server may be the terminal and the server in a system shown in FIG. 1. As shown in FIG. 12, the virtual object control method includes the following steps (1210 to 1260):

Step 1210: A user clicks a flying arrow controlling control to cast a flying arrow, and the flying arrow controlling control is a flying arrow cast control.

Step 1220: The flying arrow controlling control is transformed into a flying arrow path controlling control.

Step 1230: The user clicks the flying arrow path controlling control again to enter a flying arrow path controlling status.

Step 1240: Determine whether a picture restore condition is met; perform step 1250 if the picture restore condition is met; and perform step 1260 if the picture restore condition is not met.

Step 1250: Close the flying arrow path controlling status.

Step 1260: Control a virtual character and the flying arrow to move according to user operations.

After the virtual character casts a flying arrow skill, the flying arrow skill is transformed into another skill. The user clicks the flying arrow controlling control again, and the virtual character enters a flying arrow skill controlling status. In this status, the character may move freely and perform flying arrow skill operations synchronously, and the user may alternatively click a close button to end the flying arrow skill controlling status.

According to the virtual object control method provided in this embodiment of the present disclosure, when controlling a virtual summoned object to move in a virtual scene by using a summoned object controlling control, a movement of a virtual character in the virtual scene may be controlled by using a character controlling control, so that a plurality of virtual objects may be controlled in a virtual scene at the same time. Therefore, a plurality of virtual objects in the virtual scene may be controlled simultaneously, so that a switching operation for changing a controlled object is reduced, human-machine interaction efficiency and accuracy for controlling the virtual object are improved, and waste of processing resources and power resources of a terminal is further reduced.

Figure 13:
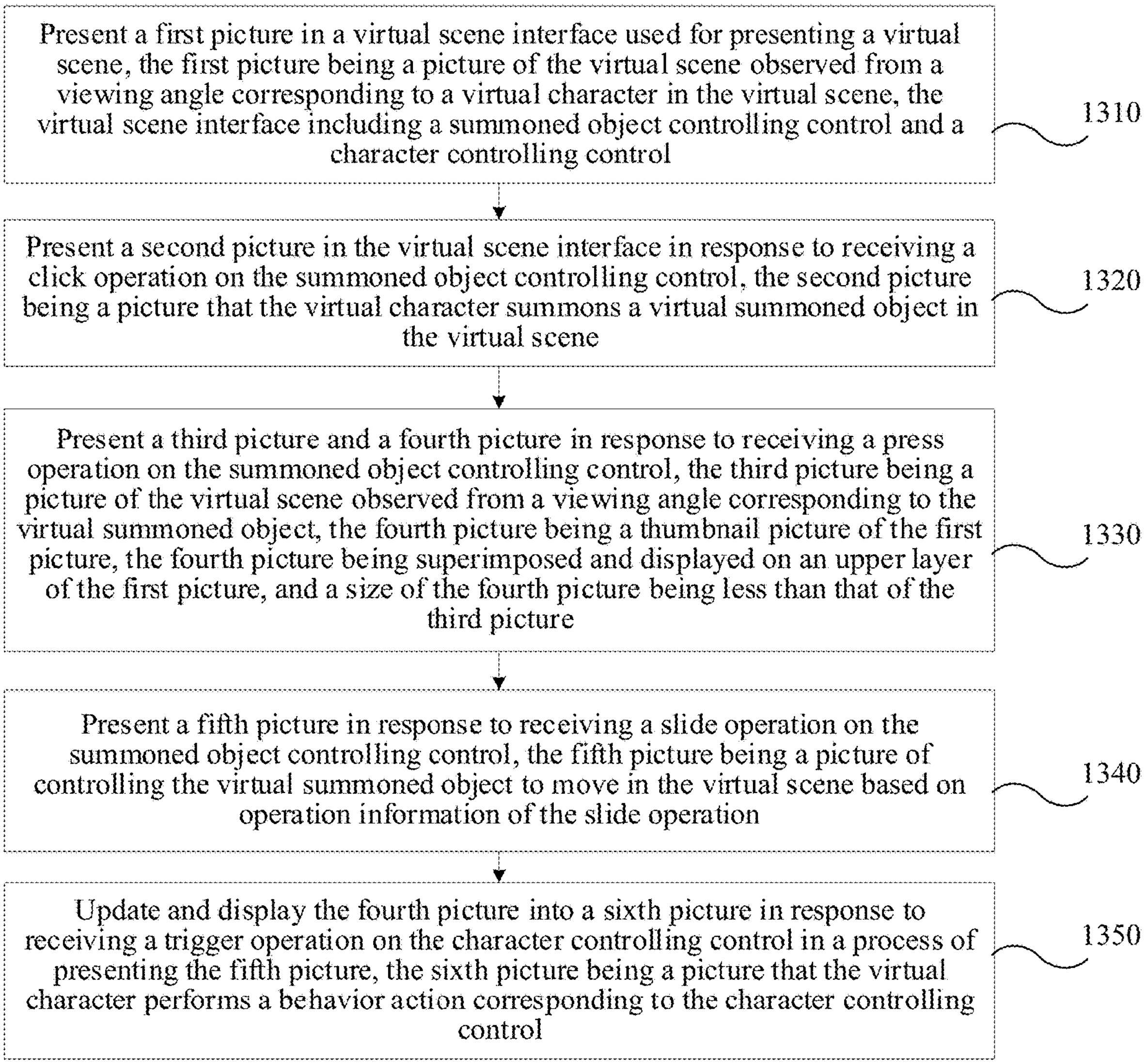
FIG. 13 is a schematic flowchart of a virtual object control method according to one or more embodiments of the present disclosure.

FIG. 13 is a flowchart of a virtual object control method according to an exemplary embodiment of the present disclosure. The virtual object control method may be performed by using a terminal (for example, the client in the terminal). The terminal may be the terminal in the system shown in FIG. 1. As shown in FIG. 13, the virtual object control method includes the following steps (1310 to 1350):

Step 1310: Present a first picture in a virtual scene interface used for presenting a virtual scene, the first picture being a picture of the virtual scene observed from a viewing angle corresponding to a virtual character in the virtual scene, the virtual scene interface including a summoned object controlling control and a character controlling control.

Step 1320: Present a second picture in the virtual scene interface in response to receiving a click operation on the summoned object controlling control, the second picture being a picture that the virtual character summons a virtual summoned object in the virtual scene.

Step 1330: Present a third picture and a fourth picture in response to receiving a press operation on the summoned object controlling control, the third picture being a picture of the virtual scene observed from a viewing angle corresponding to the virtual summoned object, the fourth picture being a thumbnail picture of the first picture, the fourth picture being superimposed and displayed on an upper layer of the first picture, and a size of the fourth picture being less than that of the third picture.

Step 1340: Present a fifth picture in response to receiving a slide operation on the summoned object controlling control, the fifth picture being a picture of controlling the virtual summoned object to move in the virtual scene based on operation information of the slide operation.

Step 1350: Update and display the fourth picture into a sixth picture in response to receiving a trigger operation on the character controlling control in a process of presenting the fifth picture, the sixth picture being a picture that the virtual character performs a behavior action corresponding to the character controlling control.

According to the virtual object control method in a virtual scene provided in the embodiments of the present disclosure, under a premise of controlling a virtual summoned object whose movement path may be controlled in the virtual scene, a virtual scene picture obtained by observing the virtual scene from a viewing angle corresponding to a virtual character and a virtual scene picture obtained by observing the virtual scene from a viewing angle corresponding to the virtual summoned object are separately displayed in the virtual scene, so that the user may observe two controlled objects at different display regions at the same time when controlling the virtual character and the virtual summoned object at the same time, so that a plurality of virtual objects are controlled in a virtual scene at the same time. Therefore, a plurality of virtual objects in the virtual scene may be controlled simultaneously, so that a switching operation for changing a controlled object is reduced, human-machine interaction efficiency and accuracy for controlling the virtual object are improved, and waste of processing resources and power resources of a terminal is further reduced.

Figure 14:
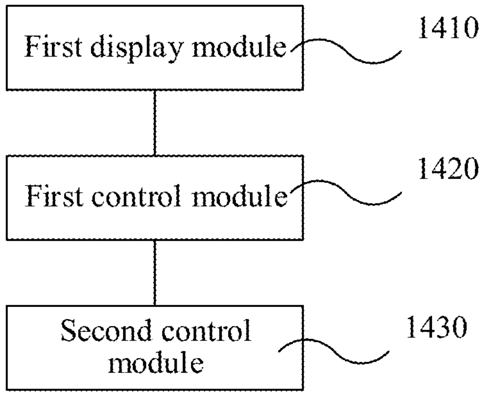
FIG. 14 is a schematic structural block diagram of a virtual object control apparatus according to one or more embodiments of the present disclosure.

FIG. 14 is a structural block diagram of a virtual object control apparatus according to an exemplary embodiment of the present disclosure. The virtual object control apparatus may be implemented as a part of a terminal or a server by using software, hardware, or a combination thereof, to implement all or some steps of the method shown in any embodiment in FIG. 3, FIG. 5, or FIG. 12. As shown in FIG. 14, the virtual object control apparatus may include: a first display module 1410, configured to display a first scene picture in a virtual scene interface used for presenting a virtual scene, the first scene picture being a picture of the virtual scene observed from a viewing angle corresponding to a virtual summoned object in the virtual scene, the virtual scene interface including a summoned object controlling control and a character controlling control; a first control module 1420, configured to display, in response to a first touch operation on the summoned object controlling control, that the virtual summoned object moves in the virtual scene based on operation information of the first touch operation; and a second control module 1430, configured to display, in a movement process of the virtual summoned object in the virtual scene based on the operation information and in response to a second touch operation on the character controlling control, that a virtual character performs a behavior action corresponding to the character controlling control.

In an implementation, the apparatus further includes: a second display module, configured to display a second scene picture in the virtual scene interface, the second scene picture being a picture of the virtual scene observed from a viewing angle corresponding to the virtual character; and a third control module, configured to control, in response to receiving a third touch operation on the summoned object controlling control, the virtual character to summon the virtual summoned object in the virtual scene.

In an implementation, the first display module 1410 is configured to switch, in response to receiving a fourth touch operation on the summoned object controlling control, a scene picture in the virtual scene interface from the second scene picture to the first scene picture for displaying, the fourth touch operation being performed after the third touch operation.

In an implementation, the apparatus further includes: a third display module, configured to superimpose and display, in response to receiving a fourth touch operation on the summoned object controlling control, a thumbnail picture of the second scene picture on an upper layer of the first scene picture, a size of the thumbnail picture being less than a size of the first scene picture.

In an implementation, the apparatus further includes: a switching module, configured to switch display positions of the first scene picture and the second scene picture in response to receiving a picture switching operation.

In an implementation, the apparatus further includes: a restoration module, configured to restore and display the second scene picture in the virtual scene interface in response to that a picture restore condition is met, the picture restore condition including that: a trigger operation on a controlling release control in the virtual scene interface is received; a triggered effect corresponding to the virtual summoned object is triggered; or a duration after the virtual summoned object is summoned reaches a preset valid duration.

In an implementation, the first control module 1420 includes: an obtaining submodule, configured to obtain, in response to the first touch operation on the summoned object controlling control, an offset angle of the virtual summoned object relative to an initial direction based on the operation information of the first touch operation; and a control submodule, configured to control a movement direction of the virtual summoned object in the virtual scene according to the offset angle.

In an implementation, the operation information includes a relative direction, and the relative direction is a direction of an operation position of the first touch operation relative to a center position of the summoned object controlling control.

The control submodule is configured to: determine a target offset angle of the virtual summoned object relative to the initial direction based on the relative direction; obtaining the target offset angle as the offset angle in response to that the target offset angle is within a deflectable angle range; obtaining, in response to that the target offset angle is greater than an angle upper limit of the deflectable angle range, the angle upper limit as the offset angle; and obtain, in response to that the target offset angle is less than an angle lower limit of the deflectable angle range, the angle lower limit as the offset angle.

In an implementation, the apparatus further includes: a first presentation module, configured to present an angle indicator pattern corresponding to the virtual summoned object in the first scene picture, the angle indicator pattern being used for indicating the deflectable angle range.

In an implementation, the apparatus further includes: a second presentation module, configured to present an angle indicator identifier in the first scene picture, the angle indicator identifier being used for indicating a movement direction of the virtual summoned object in the first scene picture.

Figure 15:
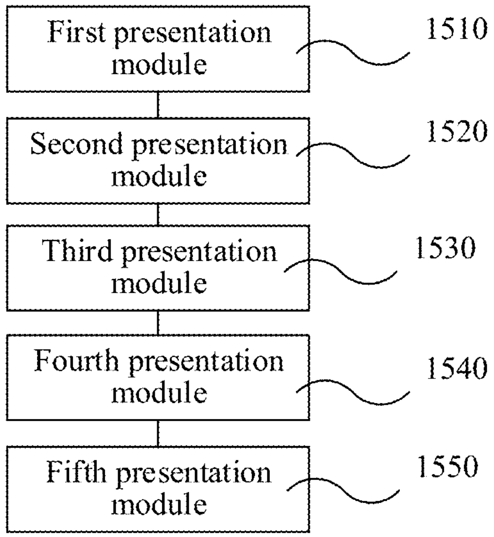
FIG. 15 is a schematic structural block diagram of a virtual object control apparatus according to one or more embodiments of the present disclosure.

According to the virtual object control method provided in this embodiment of the present disclosure, when or in response to determining that there is a virtual summoned object of a virtual character object in a virtual scene, when controlling a virtual summoned object to move in the virtual scene by using a summoned object controlling control, a behavior action of the virtual character in the virtual scene may be controlled by using a character controlling control. Therefore, a plurality of virtual objects may be controlled in a virtual scene at the same time without an additional switching operation, so as to improve control efficiency for a virtual object. FIG. 15 is a structural block diagram of a virtual object control apparatus according to an exemplary embodiment of the present disclosure. The virtual object control apparatus may be implemented as a part of a terminal or a server by using software, hardware, or a combination thereof, to implement all or some steps of the method shown in the embodiment in FIG. 13. As shown in FIG. 15, the virtual object control apparatus may include: a first presentation module 1510, configured to present a first picture in a virtual scene interface used for presenting a virtual scene, the first picture being a picture of the virtual scene observed from a viewing angle corresponding to a virtual character in the virtual scene, the virtual scene interface including a summoned object controlling control and a character controlling control; a second presentation module 1520, configured to present a second picture in the virtual scene interface in response to receiving a click operation on the summoned object controlling control, the second picture being a picture that the virtual character summons a virtual summoned object in the virtual scene; a third presentation module 1530, configured to present a third picture and a fourth picture in response to receiving a press operation on the summoned object controlling control, the third picture being a picture of the virtual scene observed from a viewing angle corresponding to the virtual summoned object, the fourth picture being a thumbnail picture of the first picture, the fourth picture being superimposed and displayed on an upper layer of the first picture, and a size of the fourth picture being less than that of the third picture; a fourth presentation module 1540, configured to present a fifth picture in response to receiving a slide operation on the summoned object controlling control, the fifth picture being a picture of controlling the virtual summoned object to move in the virtual scene based on operation information of the slide operation; and a fifth presentation module 1550, configured to update and display the fourth picture into a sixth picture in response to receiving a trigger operation on the character controlling control in a process of presenting the fifth picture, the sixth picture being a picture that the virtual character performs a behavior action corresponding to the character controlling control.

According to the virtual object control apparatus in a virtual scene provided in the embodiments of the present disclosure, in an implementation of controlling a virtual summoned object whose movement path may be controlled in the virtual scene, a second scene picture obtained by observing the virtual scene from a viewing angle corresponding to a virtual character and a first scene picture obtained by observing the virtual scene from a viewing angle corresponding to the virtual summoned object are separately displayed in the virtual scene, so that the user may observe two controlled objects at different display regions when controlling the virtual character and the virtual summoned object at the same time. so that a plurality of virtual objects are controlled in a virtual scene at the same time. Therefore, a plurality of virtual objects in the virtual scene may be controlled simultaneously, so that a switching operation for changing a controlled object is reduced, human-machine interaction efficiency and accuracy for controlling the virtual object are improved, and waste of processing resources and power resources of a terminal is further reduced.

Figure 16:
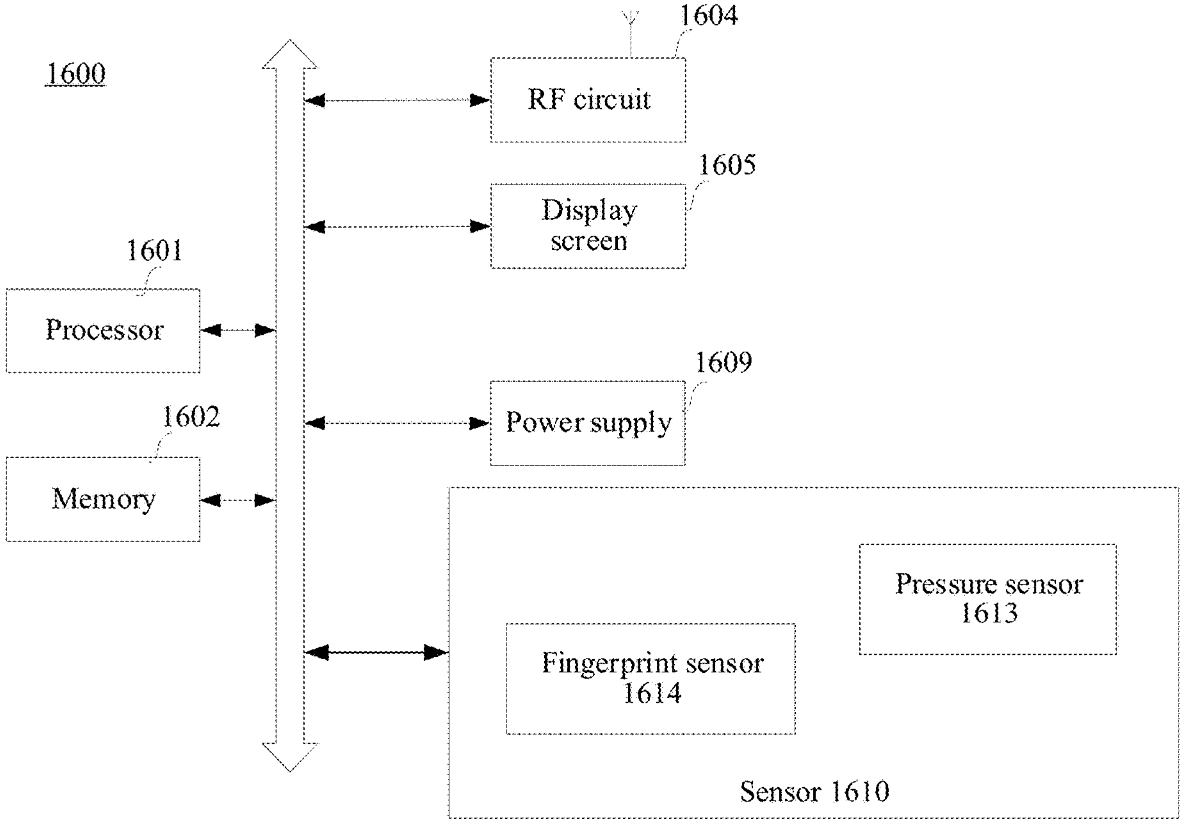
FIG. 16 is a schematic structural block diagram of a computer device according to one or more embodiments of the present disclosure.

FIG. 16 is a structural block diagram of a computer device 1600 according to an exemplary embodiment. The computer device 1600 may be a terminal shown in FIG. 1, such as a smartphone, a tablet computer, a moving picture experts group audio layer III (MP3) player, a moving picture experts group audio layer IV (MP4) player, a notebook computer, or a desktop computer. The computer device 1600 may be further referred to as another name such as user equipment, a portable terminal, a laptop terminal, or a desktop terminal.

Generally, the computer device 1600 includes a processor 1601 and a memory 1602.

The processor 1601 may include one or more processing cores. For example, the processor may be a 4-core processor or an 8-core processor. The processor 1601 may be implemented by using at least one hardware form of a digital signal processor (DSP), a field-programmable gate array (FPGA), and a programmable logic array (PLA). The processor 1601 may alternatively include a main processor and a coprocessor. The main processor is configured to process data in an active state, also referred to as a central processing unit (CPU). The coprocessor is a low-power processor configured to process data in a standby state. In some embodiments, the processor 1601 may be integrated with a graphics processing unit (GPU). The GPU is configured to render and draw content that may need to be displayed on a display screen. In some embodiments, the processor 1601 may further include an artificial intelligence (AI) processor. The AI processor is configured to process computing operations related to machine learning.

The memory 1602 may include one or more computer-readable storage media that may be non-transitory. The memory 1602 may further include a high-speed random access memory (RAM), and a non-volatile memory such as one or more magnetic disk storage devices or flash storage devices. In some embodiments, the non-transitory computer-readable storage medium in the memory 1602 is configured to store at least one instruction, and the at least one instruction is configured to be executed by the processor 1601 to implement the interface display method provided in the method embodiments of the present disclosure.

In some embodiments, the computer device 1600 may further include a radio frequency (RF) circuit 1604 and a display screen 1603. The RF circuit 1604 is configured to receive and transmit an RF signal, which is also referred to as an electromagnetic signal. The RF circuit 1604 communicates with a communication network and other communication devices through the electromagnetic signal. The RF circuit 1604 converts an electrical signal into an electromagnetic signal for transmission, or converts a received electromagnetic signal into an electrical signal. In certain embodiments, the RF circuit 1604 includes: an antenna system, an RF transceiver, one or more amplifiers, a tuner, an oscillator, a digital signal processor, a codec chip set, a subscriber identity module card, and the like. The RF circuit 1604 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a Wi-Fi network. In some embodiments, the RF circuit 1604 may further include a circuit related to near field communication (NFC), which is not limited in the present disclosure.

The display screen 1605 is configured to display a user interface (UI). The UI may include a graphic, text, an icon, a video, and any combination thereof. When the display screen 1605 is a touch display screen, the display screen 1605 also has a capability to collect a touch signal on or above a surface of the display screen 1605. The touch signal may be inputted, as a control signal, to the processor 1601 for processing. In this implementation, the display screen 1605 may be further configured to provide a virtual button and/or a virtual keyboard, which is also referred to as a soft button and/or a soft keyboard. In some embodiments, there may be one display screen 1605, disposed on a front panel of the terminal 1600. In some other embodiments, there may be at least two display screens 1605, disposed on different surfaces of the computer device 1600 respectively or in a folded design. In still some other embodiments, the display screen 1605 may be a flexible display screen, disposed on a curved surface or a folded surface of the computer device 1600. The display screen 1605 may further be set to have a non-rectangular irregular graph, that is, a special-shaped screen. The display screen 1605 may be prepared by using materials such as a liquid crystal display (LCD), an organic light-emitting diode (OLED), or the like.

The power supply 1609 is configured to supply power to components in the computer device 1600. The power supply 1609 may be an alternating current, a direct current, a primary battery, or a rechargeable battery. When or in response to determining that the power supply 1609 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the computer device 1600 may also include one or more sensors 1610. The one or more sensors 1610 include, but are not limited to, a pressure sensor 1613 and a fingerprint sensor 1614. The pressure sensor 1613 of the display screen may be disposed on a side frame of the computer device 1600 and/or a lower layer of the touch computer device 1605. When or in response to determining that the pressure sensor 1613 is disposed on the side frame of the computer device 1600, a holding signal of the user on the computer device 1600 may be detected. The processor 1601 performs left and right hand recognition or a quick operation according to the holding signal collected by the pressure sensor 1613. When the pressure sensor 1613 is disposed on the low layer of the display screen 1605, the processor 1601 controls, according to a pressure operation of the user on the display screen 1605, an operable control on the UI. The operable control includes at least one of a button control, a scroll-bar control, an icon control, and a menu control.

The fingerprint sensor 1614 is configured to collect a fingerprint of a user, and the processor 1601 recognizes an identity of the user according to the fingerprint collected by the fingerprint sensor 1614, or the fingerprint sensor 1614 recognizes the identity of the user based on the collected fingerprint. When identifying that the user's identity is a trusted identity, the processor 1601 authorizes the user to perform related sensitive operations. The sensitive operations include: unlocking a screen, viewing encrypted information, downloading software, paying, changing a setting, and the like. The fingerprint sensor 1614 may be disposed on a front surface, a rear surface, or a side surface of the computer device 1600. When a physical button or a vendor logo is disposed on the computer device 1600, the fingerprint sensor 1614 may be integrated with the physical button or the vendor logo.

A person skilled in the art may understand that the structure shown in FIG. 16 does not constitute any limitation on the computer device 1600, and the computer device may include more components or fewer components than those shown in the figure, or some components may be combined, or a different component deployment may be used.

Figure 17:
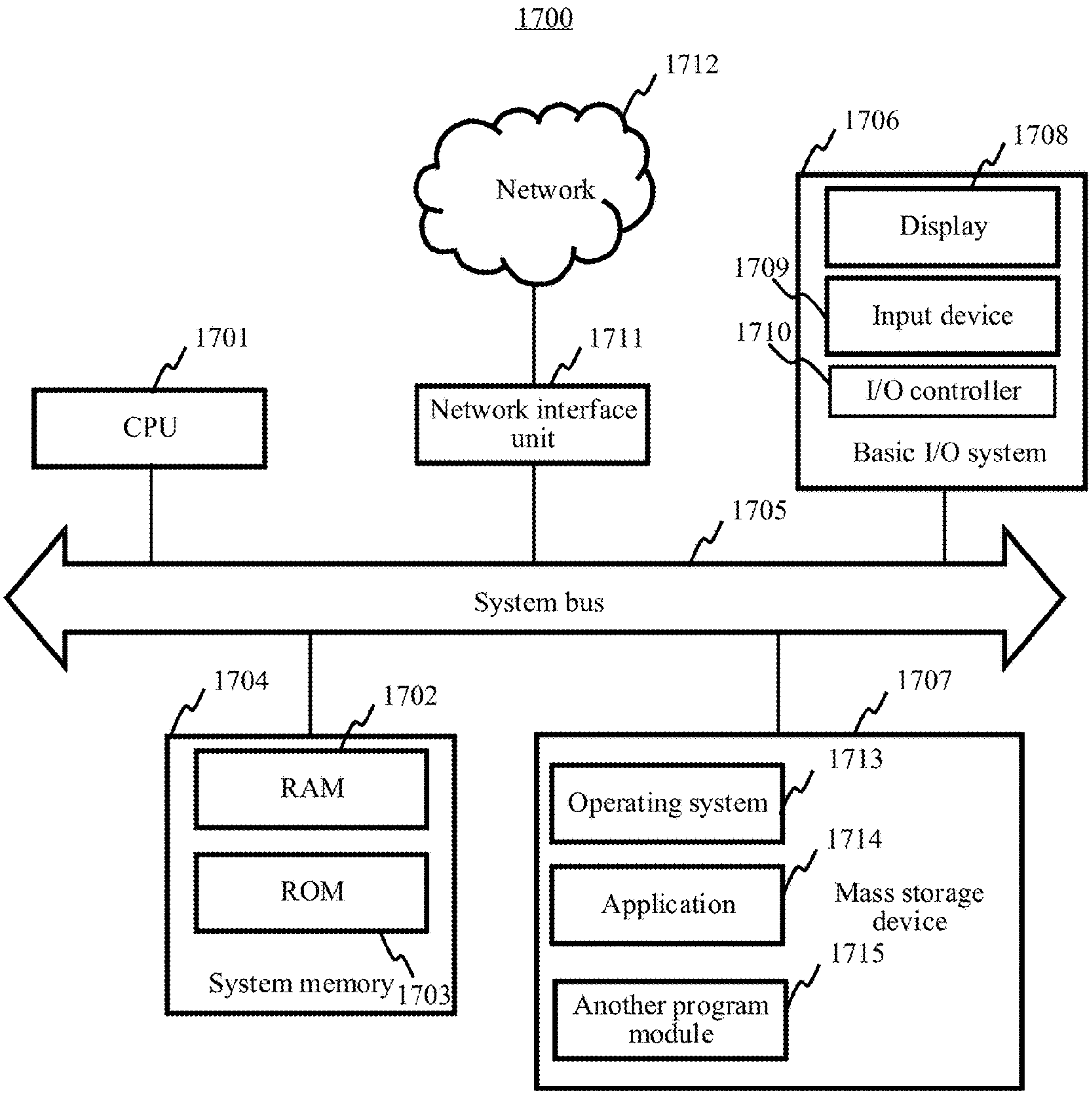
FIG. 17 is a schematic structural block diagram of a computer device according to one or more embodiments of the present disclosure.

FIG. 17 is a structural block diagram of a computer device 1700 according to an exemplary embodiment. The computer device may be implemented as the server in the solutions of the present disclosure. The computer device 1700 includes a central processing unit (CPU) 1701, a system memory 1704 including a random access memory (RAM) 1702 and a read-only memory (ROM) 1703, and a system bus 1705 connecting the system memory 1704 to the CPU 1701. The computer device 1700 further includes a basic input/output system (I/O system) 1706 configured to transmit information between components in the computer, and a mass storage device 1707 configured to store an operating system 1713, an application 1714, and another program module 1715.

The basic I/O system 1706 includes a display 1708 configured to display information, and an input device 1709 used by a user to input information, such as a mouse or a keyboard. The display 1708 and the input device 1709 are both connected to the CPU 1701 by an input/output (I/O) controller 1710 connected to the system bus 1705. The basic I/O system 1706 may further include the I/O controller 1710 for receiving and processing an input from a plurality of other devices such as a keyboard, a mouse, or an electronic stylus. Similarly, the I/O controller 1710 further provides an output to a display screen, a printer, or another type of output device.

The mass storage device 1707 is connected to the CPU 1701 by using a mass storage controller (not shown) connected to the system bus 1705. The mass storage device 1707 and an associated computer-readable medium provide non-volatile storage for the computer device 1700. That is, the mass storage device 1707 may include a computer-readable medium (not shown) such as a hard disk or a compact disc ROM (CD-ROM) drive.

Without loss of generality, the computer readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), an electrically-erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Suitable computer storage medium is not limited to the types as described. The system memory 1704 and the mass storage device 1707 may be collectively referred to as a memory.

According to the embodiments of the present disclosure, the computer device 1700 may further be connected, through a network such as the Internet, to a remote computer on the network and run. That is, the computer device 1700 may be connected to a network 1712 by using a network interface unit 1711 connected to the system bus 1705, or may be connected to another type of network or a remote computer system (not shown) by using a network interface unit 1711.

The memory further includes one or more programs. The one or more programs are stored in the memory. The CPU 1701 executes the one or more programs to implement all or some steps of the method shown in the embodiment of FIG. 3, FIG. 5, or FIG. 12.

In an exemplary embodiment, a non-temporary computer-readable storage medium including an instruction is further provided, for example, a memory includes at least one instruction, at least one program, a code set, or an instruction set. The at least one instruction, the at least one program, the code set, or the instruction set may be executed by a processor to implement all or some steps in the method shown in any embodiment of FIG. 3, FIG. 5, FIG. 12, or FIG. 13. For example, the non-temporary computer-readable storage medium may be a ROM, a RAM, a compact disc ROM (CD-ROM), a magnetic tape, a floppy disk, an optical data storage device, or the like.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

After considering the present disclosure and practicing the present disclosure, a person skilled in the art would easily conceive of other implementations of the present disclosure. The present disclosure is intended to cover any variation, use, or adaptive change of the present disclosure. These variations, uses, or adaptive changes follow the general principles of the present disclosure and include common general knowledge or common technical means in the art that are not disclosed in the present disclosure. The present disclosure and the embodiments are considered as merely exemplary, and the real scope and spirit of the present disclosure are pointed out in the following claims.

It is to be understood that the present disclosure is not limited to the precise structures described above and shown in the accompanying drawings, and various modifications and changes may be made without departing from the scope of the present disclosure. The scope of the present disclosure is subject only to the appended claims.

What is claimed is:

1. A virtual object control method, performed by a terminal coupled with a touch screen, the method comprising:

displaying a first scene picture in a virtual scene interface used for presenting a virtual scene, the first scene picture being a picture of the virtual scene observed from a viewing angle corresponding to a virtual summoned object in the virtual scene, the first scene picture including the virtual summoned object, a summoned object controlling control and a character controlling control that are simultaneously presented at different locations on the same touch screen;

displaying, in response to a first touch operation on the summoned object controlling control presented on the touch screen, that the virtual summoned object moves in the virtual scene based on operation information of the first touch operation; and displaying, in a movement process of the virtual summoned object in the virtual scene and in response to a second touch operation on the character controlling control presented on the touch screen, that a virtual character performs a behavior action corresponding to the character controlling control, wherein the second touch operation on the character controlling control is detected at a same time when the virtual summoned object is controlled to move in response to the first touch operation on the summoned object controlling control, and the virtual summoned object and the virtual character are controlled at the same time without an additional switching operation.

2. The method according to claim 1, further comprising:

displaying a second scene picture in the virtual scene interface, the second scene picture being a picture of the virtual scene observed from a viewing angle corresponding to the virtual character; and controlling, in response to receiving a third touch operation on the summoned object controlling control, the virtual character to summon the virtual summoned object in the virtual scene.

3. The method according to claim 2, wherein displaying the first scene picture in the virtual scene interface comprises:

switching, in response to receiving a fourth touch operation on the summoned object controlling control, a scene picture in the virtual scene interface from the second scene picture to the first scene picture for displaying, comprising: raising an observing lens for the virtual scene from a viewing angle corresponding to the virtual character in the second scene picture to the viewing angle corresponding to the virtual summoned object and placing an anchor point of the lens before the virtual summoned object to obtain the first scene picture;

the fourth touch operation being performed after the third touch operation.

4. The method according to claim 2, wherein displaying the second scene picture in the virtual scene interface comprises:

superimposing and displaying, in response to receiving a fourth touch operation on the summoned object controlling control, a thumbnail picture of the second scene picture on an upper layer of the first scene picture, a size of the thumbnail picture being less than a size of the first scene picture.

5. The method according to claim 4, further comprising: switching display positions of the first scene picture and the second scene picture in response to receiving a picture switching operation.

6. The method according to claim 2, further comprising: restoring and displaying the second scene picture in the virtual scene interface in response to that a picture restore condition is met, wherein the picture restore condition includes that:

a trigger operation on a controlling release control in the virtual scene interface is received;

a triggered effect corresponding to the virtual summoned object is triggered; or a duration after the virtual summoned object is summoned reaches a preset valid duration.

7. The method according to claim 1, wherein displaying that the virtual summoned object moves in the virtual scene comprises:

obtaining, in response to the first touch operation on the summoned object controlling control, an offset angle of the virtual summoned object relative to an initial direction based on the operation information of the first touch operation; and controlling a movement direction of the virtual summoned object in the virtual scene according to the offset angle.

8. The method according to claim 7, wherein the operation information includes a relative direction, and the relative direction is a direction of an operation position of the first touch operation relative to a center position of the summoned object controlling control, and wherein obtaining the offset angle of the virtual summoned object comprises:

determining a target offset angle of the virtual summoned object relative to the initial direction based on the relative direction;

obtaining the target offset angle as the offset angle in response to determining that the target offset angle is within a deflectable angle range;

obtaining, in response to determining that the target offset angle is greater than an angle upper limit of the deflectable angle range, the angle upper limit as the offset angle; and obtaining, in response to determining that the target offset angle is less than an angle lower limit of the deflectable angle range, the angle lower limit as the offset angle.

9. The method according to claim 8, further comprising: presenting an angle indicator pattern corresponding to the virtual summoned object in the first scene picture, the angle indicator pattern being used for indicating the deflectable angle range.

10. The method according to claim 8, further comprising: presenting an angle indicator identifier in the first scene picture, the angle indicator identifier being used for indicating a movement direction of the virtual summoned object in the first scene picture.

11. A virtual object control apparatus, comprising: a memory storing computer program instructions; a touchscreen, and a processor coupled to the memory and configured to execute the computer program instructions and perform:

displaying a first scene picture in a virtual scene interface used for presenting a virtual scene, the first scene picture being a picture of the virtual scene observed from a viewing angle corresponding to a virtual summoned object in the virtual scene, the first scene picture including the virtual summoned object, a summoned object controlling control and a character controlling control that are simultaneously presented at different locations on the same touch screen;

displaying, in response to a first touch operation on the summoned object controlling control presented on the touch screen, that the virtual summoned object moves in the virtual scene based on operation information of the first touch operation; and displaying, in a movement process of the virtual summoned object in the virtual scene and in response to a second touch operation on the character controlling control presented on the touch screen, that a virtual character performs a behavior action corresponding to the character controlling control, wherein the second touch operation on the character controlling control is detected at a same time when the virtual summoned object is controlled to move in response to the first touch operation on the summoned object controlling control, and the virtual summoned object and the virtual character are controlled at the same time without an additional switching operation.

12. The virtual object control apparatus according to claim 11, wherein processor is further configured to execute the computer program instructions and perform:

displaying a second scene picture in the virtual scene interface, the second scene picture being a picture of the virtual scene observed from a viewing angle corresponding to the virtual character; and controlling, in response to receiving a third touch operation on the summoned object controlling control, the virtual character to summon the virtual summoned object in the virtual scene.

13. The virtual object control apparatus according to claim 12, wherein displaying the first scene picture in the virtual scene interface includes:

switching, in response to receiving a fourth touch operation on the summoned object controlling control, a scene picture in the virtual scene interface from the second scene picture to the first scene picture for displaying, the fourth touch operation being performed after the third touch operation.

14. The virtual object control apparatus according to claim 12, wherein displaying the second scene picture in the virtual scene interface includes:

superimposing and displaying, in response to receiving a fourth touch operation on the summoned object controlling control, a thumbnail picture of the second scene picture on an upper layer of the first scene picture, a size of the thumbnail picture being less than a size of the first scene picture.

15. The virtual object control apparatus according to claim 14, wherein processor is further configured to execute the computer program instructions and perform:

switching display positions of the first scene picture and the second scene picture in response to receiving a picture switching operation.

16. The virtual object control apparatus according to claim 12, wherein processor is further configured to execute the computer program instructions and perform:

restoring and displaying the second scene picture in the virtual scene interface in response to that a picture restore condition is met, wherein the picture restore condition includes that:

a trigger operation on a controlling release control in the virtual scene interface is received;

a triggered effect corresponding to the virtual summoned object is triggered; or a duration after the virtual summoned object is summoned reaches a preset valid duration.

17. The virtual object control apparatus according to claim 11, wherein displaying that the virtual summoned object moves in the virtual scene includes:

obtaining, in response to the first touch operation on the summoned object controlling control, an offset angle of the virtual summoned object relative to an initial direction based on the operation information of the first touch operation; and controlling a movement direction of the virtual summoned object in the virtual scene according to the offset angle.

18. A non-transitory computer-readable storage medium storing computer program instructions executable by at least one processor to perform:

displaying a first scene picture in a virtual scene interface used for presenting a virtual scene, the first scene picture being a picture of the virtual scene observed from a viewing angle corresponding to a virtual summoned object in the virtual scene, the first scene picture including the virtual summoned object, a summoned object controlling control and a character controlling control that are simultaneously presented at different locations on a same touch screen coupled to the at least one processor;

displaying, in response to a first touch operation on the summoned object controlling control presented on the touch screen, that the virtual summoned object moves in the virtual scene based on operation information of the first touch operation; and displaying, in a movement process of the virtual summoned object in the virtual scene and in response to a second touch operation on the character controlling control presented on the touch screen, that a virtual character performs a behavior action corresponding to the character controlling control, wherein the second touch operation on the character controlling control is detected at a same time when the virtual summoned object is controlled to move in response to the first touch operation on the summoned object controlling control, and the virtual summoned object and the virtual character are controlled at the same time without an additional switching operation.

19. The method according to claim 1, wherein:

the behavior action corresponding to the character controlling control is a movement action; and the virtual summoned object and the virtual character are controlled to move respectively at the same time without the additional switching operation.

20. The method according to claim 3, further comprising:

in a process of switching from the second scene picture to the first scene picture, providing a transition picture that represents a change of the viewing angle.

* * * * *